(12) United States Patent
Han et al.

(10) Patent No.: US 12,401,736 B2
(45) Date of Patent: Aug. 26, 2025

(54) ROTATING DEVICE AND ELECTRONIC EQUIPMENT ACCESSORY

(71) Applicant: Shenzhen Lanhe Technologies Co., Ltd., Shenzhen (CN)

(72) Inventors: Qing Han, Shenzhen (CN); Jianhua Liu, Shenzhen (CN); Zhuoting Ye, Shenzhen (CN); Jinhong Xie, Shenzhen (CN); Cheng Liu, Shenzhen (CN)

(73) Assignee: Shenzhen Lanhe Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/961,507

(22) Filed: Nov. 27, 2024

(65) Prior Publication Data

US 2025/0112983 A1  Apr. 3, 2025

Related U.S. Application Data

(63) Continuation of application No. PCT/CN2023/132148, filed on Nov. 16, 2023.

(30) Foreign Application Priority Data

Nov. 16, 2022 (CN) .......................... 202223095893.1
Sep. 5, 2023 (CN) .......................... 202322414061.X
Oct. 26, 2023 (CN) .......................... 202322914218.5

(51) Int. Cl.
*H04M 1/04* (2006.01)
*H04M 1/02* (2006.01)

(52) U.S. Cl.
CPC ........... *H04M 1/04* (2013.01); *H04M 1/0203* (2025.01)

(58) Field of Classification Search
CPC .... H04M 1/04; H04M 1/0203; H04B 1/3888; H04B 1/3877; G06F 2200/1633; A47G 1/143
See application file for complete search history.

(56) References Cited

U.S. PATENT DOCUMENTS 10,326,487 B2  6/2019  Mody
2018/0248580 A1*  8/2018  Edman ................. H04B 1/3877
(Continued)

FOREIGN PATENT DOCUMENTS

CN  208901017 U  5/2019
CN  211551068 U  9/2020
(Continued)

*Primary Examiner* — Quoc Thai N Vu
(74) *Attorney, Agent, or Firm* — Andrew C. Cheng

(57) ABSTRACT

A rotating device and an electronic equipment accessory are provided. The rotating device includes a first connecting member and a second connecting member rotatable about a rotation axis relative to the first connecting member. An angle formed between the rotation axis and a length direction of the rotating device is acute such that the second connecting member can move upwards when rotating with respect to the first connecting member. Therefore, when the rotating device is applied to an electronic equipment accessory which is mounted on electronic equipment, the rotating device acting as a stand can be arranged between a magnetic charging structure of electronic equipment and a bottom edge of the electronic equipment, such that the rotating device will not shield the magnetic charging structure. The rotating device can act as a stand with a good support effect due to existing of the acute angle.

15 Claims, 24 Drawing Sheets

(56) References Cited

U.S. PATENT DOCUMENTS

| | | | |
|---|---|---|---|
| 2019/0059540 A1* | 2/2019 | Wu | H04B 1/3888 |
| 2020/0028951 A1* | 1/2020 | Hummel | H04M 1/04 |
| 2022/0094379 A1* | 3/2022 | Balderston | A45F 5/1516 |
| 2022/0140852 A1* | 5/2022 | Zeng | B32B 3/08 |
| | | | 455/575.8 |

FOREIGN PATENT DOCUMENTS

| | | | |
|---|---|---|---|
| CN | 213938033 U | | 8/2021 |
| CN | 215000301 U | | 12/2021 |
| CN | 216490622 U | * | 5/2022 |
| CN | 216490626 U | | 5/2022 |
| CN | 216490633 U | | 5/2022 |
| CN | 216565235 U | | 5/2022 |
| CN | 216959945 U | * | 7/2022 |
| CN | 114844964 A | * | 8/2022 |
| CN | 217159781 U | † | 8/2022 |
| CN | 218480048 U | | 2/2023 |
| CN | 219120255 U | | 6/2023 |
| CN | 219124237 U | † | 6/2023 |
| CN | 219893354 U | | 10/2023 |
| DE | 202022102681 A1 | | 8/2022 |
| JP | 6967636 B1 | | 11/2021 |
| JP | 2023153556 A | | 10/2023 |
| WO | 2021115462 A1 | | 6/2021 |

\* cited by examiner
† cited by third party

ROTATING DEVICE AND ELECTRONIC EQUIPMENT ACCESSORY

CROSS-REFERENCE TO RELATED APPLICATIONS

The present disclosure is a continuation of International Patent Application No. PCT/CN2023/132148 filed on Nov. 16, 2023, which claims priorities of China patent applications No. 202223095893.1, filed on Nov. 16, 2022, No. 202322914218.5 filed on Oct. 26, 2023 and No. 202322414061.X filed on Sep. 5, 2023. The entire contents of which are incorporated herein by reference.

FIELD

The application relates to the technical field of portable electronic equipment accessories, in particular to a rotating device and an electronic equipment accessory.

BACKGROUND

Existing electronic equipment accessories with support functionality, such as mobile phone cases, usually have a stand which is connected to a phone case via a rotating device. In order to enable both horizontally and vertically support for the electronic equipment such as a mobile phone, the stand is usually positioned closer to the middle area of the electronic equipment accessory when in use.

However, the middle areas of current mobile phones are usually provided with functional components like magnetic attraction structure and wireless charging coils. To avoid interference with the use of the magnetic attraction structure and wireless charging coils, the stands of electronic device accessories generally need to be positioned away from the middle areas of the mobile phones. This means that the stands of the electronic device accessories usually need to be set near the edges of the mobile phones. But when the stands are set near the edges of the mobile phones, the stands cannot support the mobile phones stably.

SUMMARY

To ensure that an electronic equipment stand can realize a support function and keep away from the magnetic charging structure of electronic equipment, the embodiments of the application provide a rotating device and an electronic equipment accessory.

In one aspect, the present application provides a rotating device comprising a first connecting member and a second connecting member. The second connecting member is rotatable about a rotation axis relative to the first connecting member, and an angle formed between the rotation axis and a length direction of the rotating device is acute.

In some embodiments, the angle is greater than or equal to 40° and less than or equal to 65°.

In some embodiments, the rotating device further comprises a shaft, wherein the second connecting member and the first connecting member are rotatably connected to each other via the shaft; the first connecting member is configured to connect with a mobile phone protective case; and the second connecting member is configured to support the mobile phone protective case directly or support the mobile phone protective case via a support member.

In some embodiments, a maximum thickness of the rotating device in a thickness direction is greater than or equal to 2 mm and less than or equal to 4 mm, the thickness direction being perpendicular to the length direction and the rotation axis.

In another aspect, the present invention provides an electronic equipment accessory which comprises an accessory body comprising a back panel, the back panel having a top edge and a bottom edge opposite to the top edge, the back panel comprising a first area adjacent to the bottom edge; and a rotating device mounted to the back panel and located at the first area, the rotating device comprising a shaft which inclines with respect to the bottom edge.

In some embodiments, an angle formed between an axial direction of the shaft and a length direction of the bottom edge is greater than or equal to 45° and less than or equal to 75°.

In some embodiments, the rotating device comprises a first connecting member and a second connecting member which are pivotably connected to each other via the shaft; and the back panel defines a through opening in which the shaft is located.

In some embodiments, the back panel comprises an inner surface and an outer surface opposite to the inner surface in a thickness direction of the back panel; a receiving groove is defined in the outer surface for receiving the second connecting member; and the first connecting member is at least partly fixed to the inner surface of the back panel.

In some embodiments, the receiving groove comprises a first bottom wall and a second bottom wall offset from the first bottom wall in the thickness direction of the back panel, a through hole is defined between the first bottom wall and the second bottom wall, and the first connecting member passes through the through hole.

In some embodiments, the first connecting member comprises a first connection portion, a bent portion and an extension portion arranged in sequence; the extension portion is located at the outer surface of the back panel; the first connection portion is located at the inner surface of the back panel; and the bent portion is located at the through hole.

In some embodiments, the electronic equipment accessory further comprises a first attachment part which is located at the receiving groove and covers the first connecting member.

In some embodiments, the electronic equipment accessory further comprises an attachment part which is located at the inner surface of the back panel opposite to the receiving groove; and the attachment part covers the first connecting member and the through opening.

In some embodiments, the receiving groove comprises a first bottom wall and a second bottom wall offset from the first bottom wall in the thickness direction of the back panel; a through hole is defined between the first bottom wall and the second bottom wall; and the first bottom wall is sandwiched between the first connecting member and a mounting member in the thickness direction of the back panel.

In some embodiments, a support member is connected to the second connecting member and rotatable together with the second connecting member relative to the first connecting member, and the first connecting member is fixedly connected to the back panel; the support member is connected to a side of the second connecting member opposite to the back panel, the second connecting member is connected to the shaft.

In some embodiments, the second connecting member acts as or is connected to a support member; and the support member comprises an arcuate outer end opposite to the shaft; the receiving groove comprises an arcuate inner end wall opposite to the shaft; the receiving groove defines a length direction and a width direction, and the arcuate inner end wall of the receiving groove faces the arcuate outer end of the support member with a gap formed therebetween; and a size of the gap in the length direction gradually decreases from a middle thereof to opposite sides thereof in the width direction.

In some embodiments, the back panel comprises a second area which is located between the first area and the top edge, and a magnetic attraction component is disposed at the second area.

In some embodiments, the magnetic attraction component comprises a first magnetic attraction member which comprises a plurality of segmented magnets arranged in a ring shape; and the back panel is provided with a ring-shaped cover stacked on the first magnetic attraction member in a thickness direction of the back panel.

In some embodiments, the magnetic attraction component comprises a second magnetic attraction member which has a strip shape and is located between the first magnetic attraction member and the rotating device; and the back panel is provided with a strip-shaped cover stacked on the second magnetic attraction member in the thickness direction of the back panel.

In some embodiments, the second connecting member acts as or is connected to a support member; the support member comprises a support point located at a free end thereof. When the free end of the support member is moved away from the accessory body to be located at a support state, the support point and the bottom edge cooperatively define a support surface and an included angle formed between the support surface and the back panel is greater than or equal to 60° and less than or equal to 75°.

In some embodiments, one side of the mounting member facing the second connecting member defines a notch, and the shaft is received in the notch.

The above technical solution of the application has at least the following beneficial effects:
when the rotating device is applied to an electronic equipment accessory which is mounted on electronic equipment and used as a stand of the electronic equipment, the rotating device can be arranged between a magnetic charging structure of the electronic equipment and a bottom edge of the electronic equipment, such that the rotating device will not shield the magnetic charging structure. The rotating device can act as a stand with a good support effect due to existing of the acute angle.

BRIEF DESCRIPTION OF THE DRAWINGS

To more clearly explain the technical solutions of the embodiments of the application, drawings used for describing the embodiments will be briefly introduced below. Obviously, the drawings in the following description merely illustrate some embodiments of the application, and those ordinarily skilled in the art can obtain other drawings according to the following ones without creative labor.

DESCRIPTION OF THE EMBODIMENTS

The technical solutions in the embodiments of the application will be clearly and completely described below in conjunction with the drawings of the embodiments of the application. Obviously, the embodiments in the following description are merely illustrative ones and are not all possible ones of the application. All other embodiments obtained by those ordinarily skilled in the art based on the following ones without creative labor should also fall within the protection scope of the application.

It should be noted that terms such as "first", "second", "one end" in the description and claims of the application are used for distinguishing similar objects rather than describing a specific sequence or precedence order. It should be understood that these terms can be exchanged in an appropriate case to allow the embodiments of the application described here to be implemented in other sequences different from those illustrated or described here. In addition, terms such as "comprise" and "have" and any variants thereof are intended to indicate non-exclusive inclusion. For example, a process, system, product or device comprising a series of steps or units should not be limited to the steps or units that are clearly listed, and may also comprise other steps or units that are not clearly listed or other inherent steps or units of the process, product or device.

Embodiment 1

Figure 1:
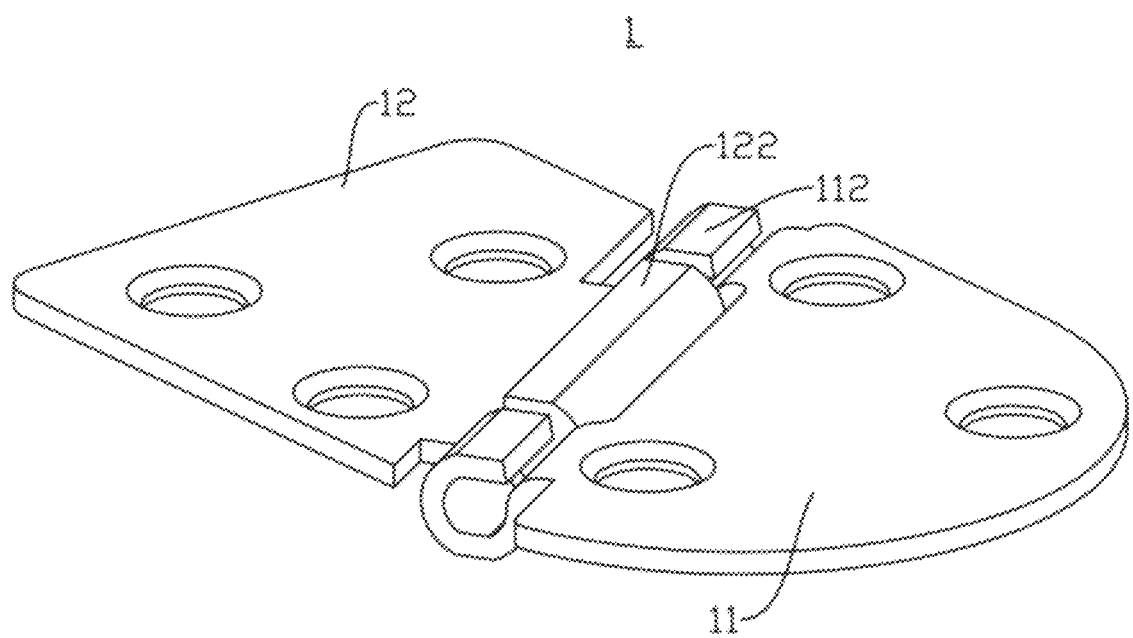
FIG. 1 is a perspective structural view of a rotating device according to Embodiment 1 of the application.
Figure 2:
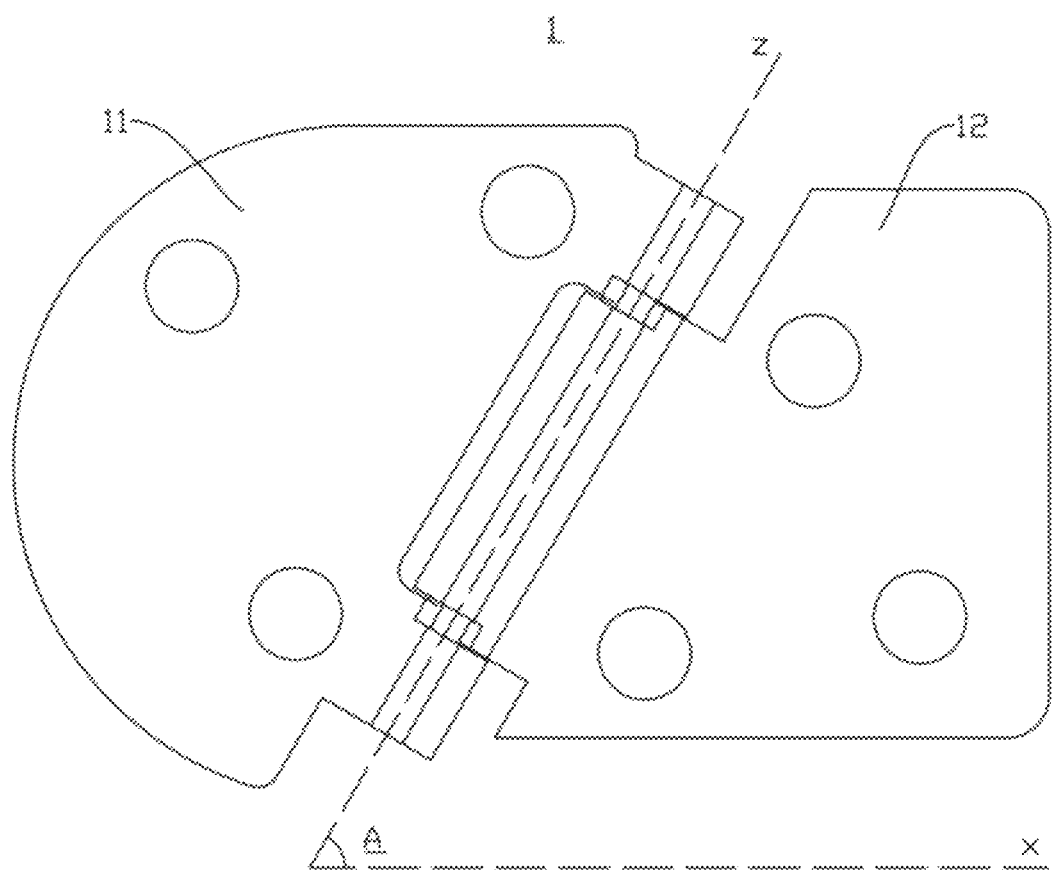
FIG. 2 is a top plan view of the rotating device in FIG. 1.

Referring to FIGS. 1 and 2, Embodiment 1 of the application provides a rotating device 1. In this embodiment, the rotating device 1 is described with a hinge device as an example. The rotating device 1 comprises a first connecting member 11, a second connecting member 12 and a shaft 13. The first connecting member 11 and the second connecting member 12 are rotatably connected by means of the shaft 13. The first connecting member 11 and the second connecting member 12 extend respectively in a length direction x of the rotating device 1. The second connecting member 12 is rotatable relative to the first connecting member 11 about a rotation axis z. A preset acute angle A is formed between the rotation axis z and the length direction x. In this embodiment, the rotation axis z coincides with the axis of the shaft 13.

According to the rotating device 1 provided by Embodiment 1 of the application, by means of the preset acute angle A formed between the rotation axis z and the length direction x, the second connecting member 12 can move upwards as shown in FIG. 2 when rotating with respect to the first connecting member 11 about the rotation axis z shown in FIG. 2. In this way, when the rotating device 1 is applied to an electronic equipment stand, the first connecting member 11 and the second connecting member 12 can be respectively connected to support members extending in the length direction x, and the second connecting member 12 can drive the corresponding support member connected thereto to turn upwards to allow the electronic equipment stand to be disposed at a position between a magnetic charging structure of electronic equipment and a bottom edge of the electronic equipment, such that the electronic equipment stand will not shield/interfere the magnetic charging structure. In addition, because of existing of the preset acute angle A of the rotating device 1, the electronic equipment can be well supported by the electronic equipment stand. Of course, the rotating device 1 may also be mounted on an electronic equipment accessory such as an electronic equipment protective case and be turned away from an area corresponding to the magnetic charging structure on the electronic equipment protective case. In this embodiment, the rotation axis z is defined by the axis of the shaft 13.

Specifically, the first connecting member 11 and the second connecting member 12 may be rotatably connected to each other by means of a rod structure and a hole structure respectively formed on the first connecting member 11 and the second connecting member 12. For example, a connecting rod acting as a shaft may be arranged on one side of the second connecting member 12, a connecting hole is formed in one side of the first connecting member 11, and the connecting rod of the second connecting member 12 is pivotably received in the connecting hole of the first connecting member 11, such that the first connecting member 11 and the second connecting member 12 are rotatably connected to each other. Alternatively, the first connecting member 11 and the second connecting member 12 are respectively sleeved around the shaft 13 to be rotatably connected to each other. Or, one of the first connecting member 11 and the second connecting member 12 is fixedly connected to the shaft 13, and the other one of the first connecting member 11 and the second connecting member 12 is rotatably connected to the shaft 13.

Specifically, the electronic equipment may be a smartphone, a tablet, a portable fan, or the like. In actual use, any one of or both the first connecting member 11 and the second connecting member 12 may be connected to a support member and may be turnable/foldable to fulfil a supporting function together with the support member. Any one of the first connecting member 11 and the second connecting member 12 may be only used for connection and fixation. For example, the first connecting member 11 is fixed to the electronic equipment or the electronic equipment accessory, wherein the electronic equipment accessory is, for example, an electronic equipment stand, a wireless charger, a portable power supply, a bag or card case, or an electronic equipment protective case. It should be noted that when one of the first connecting member 11 and the second connecting member 12 is fixedly connected to the electronic equipment or the electronic equipment accessory, the other one of the first connecting member 11 and the second connecting member 12 can be used directly as a support component, that is, no extra support member is needed. For example, the second connecting member 12 acts as one support member and is connected to the electronic equipment protective case or portable power supply via the first connecting member 11 to thereby provide a support function for the electronic equipment protective case or portable power supply.

Preferably, as shown in FIG. 2, the preset acute angle A is greater than or equal to 40° and less than or equal to 65°. In this way, when the rotating device 1 is applied to an electronic equipment stand, the electronic equipment stand can fulfil a good support effect for the electronic equipment.

Figure 3:
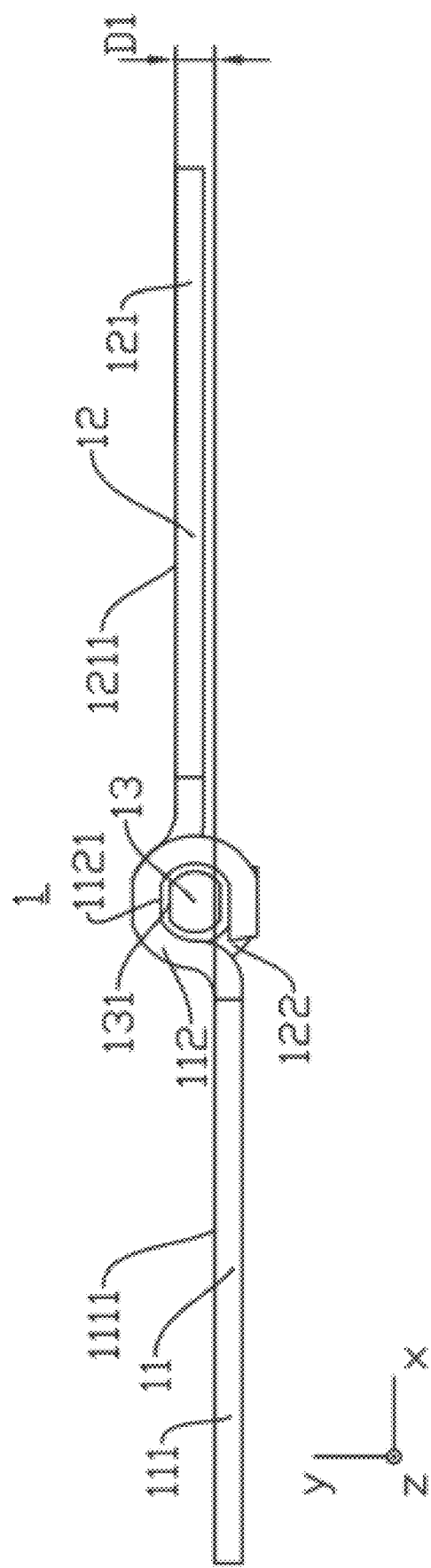
FIG. 3 is a side view of the rotating device in FIG. 1.
Figure 4:
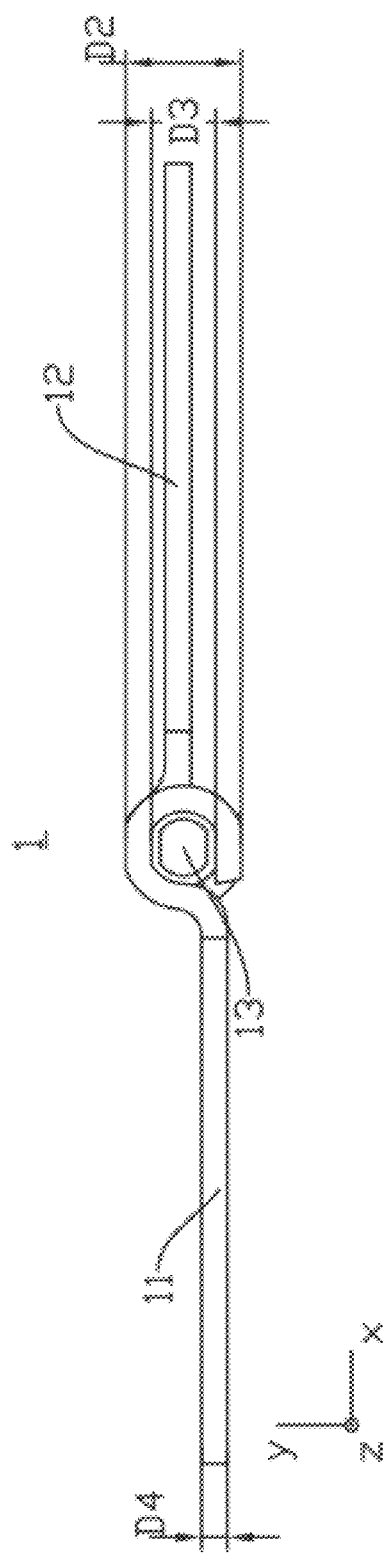
FIG. 4 illustrates dimensions of the rotating device in FIG. 3.

Referring to FIGS. 3 and 4, the first connecting member 11 comprises a first connection portion 111, the second connecting member 12 comprises a second connection portion 121, and the first connection portion 111 and the second connection portion 121 are arranged on opposite sides of the shaft 13 respectively. The first connection portion 111 and the second connection portion 121 are offset from each other in a thickness direction y of the rotating device 1. The first connection portion 111 has a first connection surface 1111, and the second connection portion 121 has a second connection surface 1211.

In a case where the rotating device 1 is applied to an electronic equipment stand, due to the first connection portion 111 and the second connection portion 121 are offset in the thickness direction y of the rotating device 1, when the electronic equipment stand is mounted on, for example, an electronic equipment protective case, the first connecting member 11 and the second connecting member 12 may be respectively mounted on opposite sides of a sidewall of the electronic equipment protective case. For example, as shown in FIG. 3, one portion of the sidewall is located above the first connection surface 1111, and the other portion of the sidewall is located at the other side of the second connection portion 121 opposite to the second connection surface 1211, such that the connection stability of the rotating device 1 and the electronic equipment protective case is improved. In addition, by means of the offset arrangement between the first and second connecting members 11/12, a rotary joint between the first connecting member 11 and the second connecting member 12 is located at the same height as one portion of the sidewall in the thickness direction y, such that the rotary joint can be hidden in the electronic equipment protective case to some extent, and the thickness of the electronic equipment protective case does not need to be increased. Specifically, the misalignment of the first connection portion 111 and the second connection portion 121 may be defined by means of a height difference D1.

Furthermore, referring to FIG. 3, the first connection surface 1111 and the second connection surface 1211 are arranged on the same side of the rotating device 1 in the thickness direction, and the height difference D1 is formed between the first connection surface 1111 and the second connection surface 1211.

The height difference D1 is defined by the first connection surface 1111 and the second connection surface 1211, so when the rotating device 1 is connected to the electronic equipment protective case, for example, to a back panel of the electronic equipment protective case, one portion of the back panel may be located above the upper side of the first connection surface 1111 and the other portion of the back panel may be located below the lower side of the second connection surface 1211. In this way, one portion of the rotating device 1 may be hidden below the back panel and the second connecting member 12 may be located above the back panel, thus reducing the height of the rotating device 1 protruding out of the back panel. The first connecting member 11 is hidden below the back panel while the second connecting member 12 is located above the back panel, which makes the connection between the rotating device 1 and the back panel more stable.

Specifically, the definition of the height difference D1 by means of the first connection surface 1111 and the second connection surface 1211 is only one approach for defining the height difference D1 provided by this embodiment. The height difference D1 may also be defined by center lines of the first connection portion 111 and the second connection portion 121 in the thickness direction y or by the distance between two adjacent surfaces of the first connection portion 111 and the second connection portion 121 in the thickness direction y. In addition, the thickness of the first connection portion 111 and the thickness of the second connection portion 121 in the thickness direction y may be equal or unequal, so the thickness of the first connection portion 111 may be different from the thickness of the second connection portion 121 in some cases. In a case where the thickness of the first connection portion 111 is different from the thickness of the second connection portion 121, those skilled in the art need to set the position of the first connection portion 111 and the position of the second connection portion 121 in the thickness direction y according to the actual outlines (including the thicknesses) of the first connection portion 111 and the second connection portion 121 to realize the misaligned arrangement.

Further, as shown in FIG. 4, a maximum thickness D2 of the rotating device 1 in the thickness direction y is greater than or equal to 2 mm and less than or equal to 4 mm. Due to the distance between a wireless charger using an electromagnetic structure for wireless charging and the coil of the electronic equipment should not be too long, the thickness of the back panel of most electronic equipment protective cases on the present market is 2-4 mm, so the maximum thickness D2 of the rotating device 1 is set to 2-4 mm to ensure that the shaft will not protrude out of the back panel in the thickness direction y when the rotating device 1 is mounted on the back panel. In this way, the surface of the back panel of the electronic equipment protective case is kept smooth, thus improving the sense of touch and aesthetics of the electronic equipment protective case when the electronic equipment protective case is held.

Specifically, the rotating device 1, for example, is configured as a sheet structure on the whole and thus has the length direction x and the thickness direction y shown in FIGS. 2-4. Referring to FIG. 4, the thickness D4 of the first connecting member 11 and the second connecting member 12 may be set to, for example, 0.5 mm. Correspondingly, the thickness of the shaft 13 in the thickness direction y is set to 1-3 mm.

Furthermore, referring to FIGS. 2-5, the shaft 13 has a shaft stop surface 131. The first connecting member 11 has a first rotary connection portion 112. The first rotary connection portion 112 is disposed around the shaft 13 and has a first stop surface 1121 corresponding to the shaft stop surface 131. The shaft stop surface 131 works together with the first stop surface 1121 to limit a rotation position of the first connecting member 11 with respect to the shaft 13, and the shaft stop surface 131 can also increase the rotational damping force of the first connecting member 11 with respect to the shaft 13.

Specifically, the shaft stop surface 131 and the first stop surface 1121 extend, for example, in the rotation axis direction z. The shaft stop surface 131 and the first stop surface 1121 may be flat surfaces, curved surfaces, or combinations of multiple flat surfaces and curved surfaces. Multiple shaft stop surfaces 131 may be arranged at intervals, and multiple first stop surfaces 1121 may be arranged corresponding to the multiple shaft stop surfaces 131. The first rotary connection portion 112 is sleeved on the shaft 13, thus being in contact with the circumferential surface of the shaft 13. For example, in the state shown in FIGS. 3 and 4, the first stop surface 1121 abuts against the shaft stop surface 131, and in this state, the first stop surface 1121 and the shaft stop surface 131 work together to limit the rotation angle of the first connecting member 11 with respect to the shaft 13. Furthermore, by means of the first stop surface 1121 and the shaft stop surface 131, the second connecting member 12 can automatically restore when it is rotated to a certain angle relative to the first connecting member 11. The cross-section, orthogonal to the rotation axis direction z, of the shaft 13 may be a circular cross-section, an oval cross-section, a section formed by a closed curve, a cross-section defined by a polygon, or a cross-section defined by a variable number of curved segments and straight segments. The shape of the cross-section of the shaft 13 depends on the arrangement of a circumferential surface of the shaft 13 in the rotation axis direction z. For example, the shaft stop surface 131 may be an uneven curved surface, so when the first connecting member 11 rotates around the shaft 13, the shaft stop surface 131 can increase the damping force on the first connecting member 11 during rotation. On this basis, the first stop surface 1121 corresponding to the shaft stop surface 131 and arranged on the first connecting member 11 can further increase the damping force and limit the amplitude of rotation of the first connecting member 11 with respect to the shaft 13. Specifically, the first stop surface 1121 corresponds to the shaft stop surface 131, which means that, for example, the shaft stop surface 131 and the first stop surface 1121 are in contact with each other, meshed with each other, or in other connection relations that can fulfil a damping and/or limiting effect.

For example, the shaft stop surface 131 may be an uneven curved surface, and the projection of the curved surface in a plane perpendicular to the axis of the shaft 13 is approximately circular or oval. Correspondingly, the first stop surface 1121 may be in a corresponding shape. Or, the shaft stop surface 131 is formed by multiple flat surfaces arranged in the circumferential direction of the shaft 13, such that the shaft 3 has a quadrangular prism shape, a pentagonal prism shape or other shapes of multi-sided prisms. The first rotary connection portion 112 is sleeved on the shaft 13, so the inner surface of the connecting hole of the first rotary connection portion 112 acts as the first stop surface 1121; and the connecting hole may be configured as a cavity matching the shaft with a prism shape, such that the first stop surface 1121 corresponds to and conforms with the shaft stop surface 131.

Figure 5:
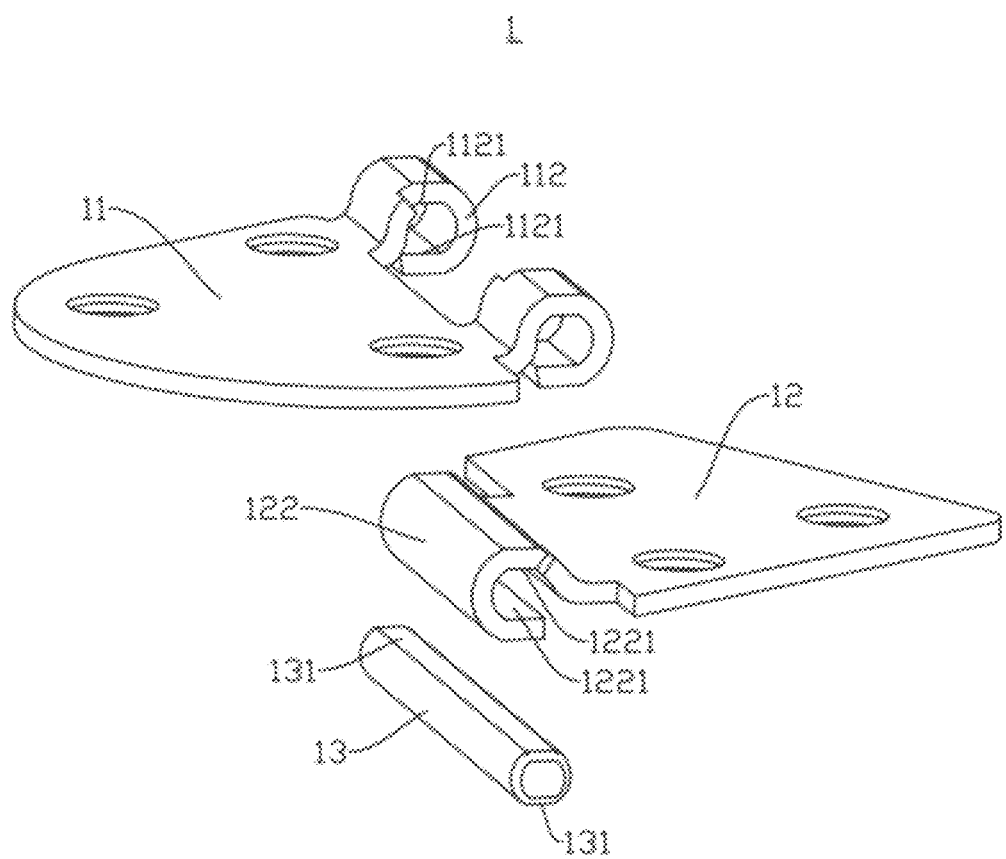
FIG. 5 is an exploded view of the rotating device in FIG. 1.

Furthermore, referring to FIGS. 3-5, two shaft stop surfaces 131 are arranged and appositely located on opposite sides of the shaft 13. Two first stop surfaces 1121 are arranged in one-to-one correspondence with the two shaft stop surfaces 131.

In some embodiments, multiple shaft stop surfaces 131 are arranged at intervals, such that the distance between the edge of the cross-section, perpendicular to the rotation axis direction z, of the shaft 13 and the rotation center of the shaft 13 is variable, as shown in FIGS. 3 and 4. Specifically, the length of the shaft 13 in the length direction x is greater than the thickness of the shaft 13 in the thickness direction y. In this way, after rotating clockwise around the rotation axis direction z shown in FIG. 3 or 4, the first rotary connection portion 112 will deform due to a dimension variation of the shaft 13 in different radial directions, thus increasing the rotational damping force of the first rotary connection portion 112 and being capable of maintaining the first rotary connection portion 112 at position after the first rotary connection portion 112 stops rotation. In addition, the shaft stop surface 131 and the first stop surface 1121 are in contact with each other in the state shown in FIGS. 3 and 4, which facilitates to prevent the first connecting member 11 from rotating randomly due to loose connection between the first connecting member 11 and the shaft 13. In this embodiment, only the second connecting member 12 is allowable to rotate relative to the shaft 13.

Further, referring to FIGS. 3-5, the second connecting member 12 has a second rotary connection portion 122. The second rotary connection portion 122 is disposed around the shaft 13 and has the second stop surface 1221 corresponding to the shaft stop surface 131. The second stop surfaces 1221 may be in contact with the shaft stop surfaces 131. The technical effect fulfilled by the second stop surface 1221 and the shaft stop surface 131 can be understood with reference to the technical effect fulfilled by the first stop surface 1121 and the shaft stop surface 131. That is, the second stop surfaces 1221 is in contact with the shaft stop surfaces 131, which can increase the rotational damping force of the first rotary connection portion 112 and maintain the first rotary connection portion 112 at position after the first rotary connection portion 112 is rotated to a desired angle with respect to the shaft 13. Specifically, structure and shape of the second stop surface 1221 may be designed with reference to that of the first stop surface 1121.

Embodiment 2

Figure 6:
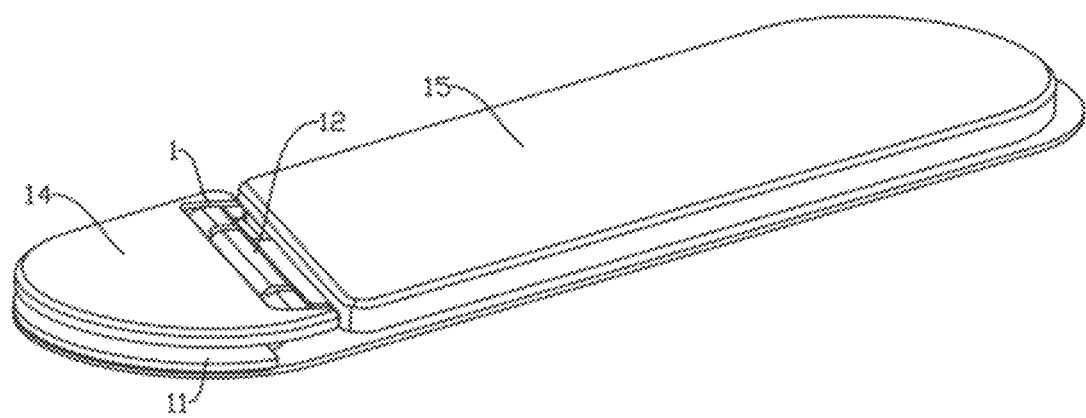
FIG. 6 is a perspective view of an electronic equipment accessory according to Embodiment 2 of the application.
Figure 7:
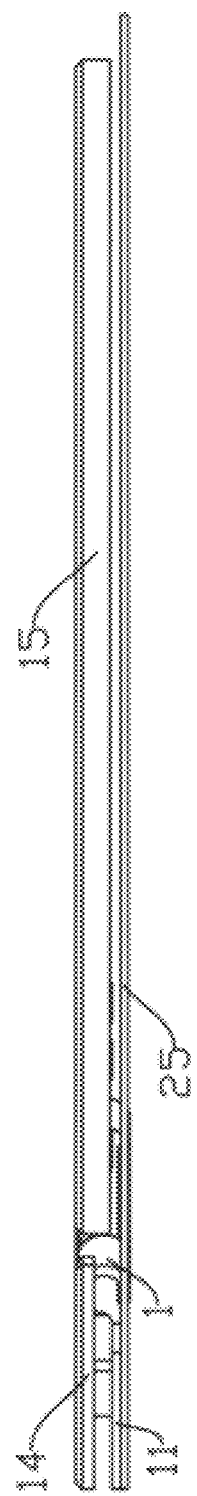
FIG. 7 is a front view of the electronic equipment accessory in FIG. 6.
Figure 8:
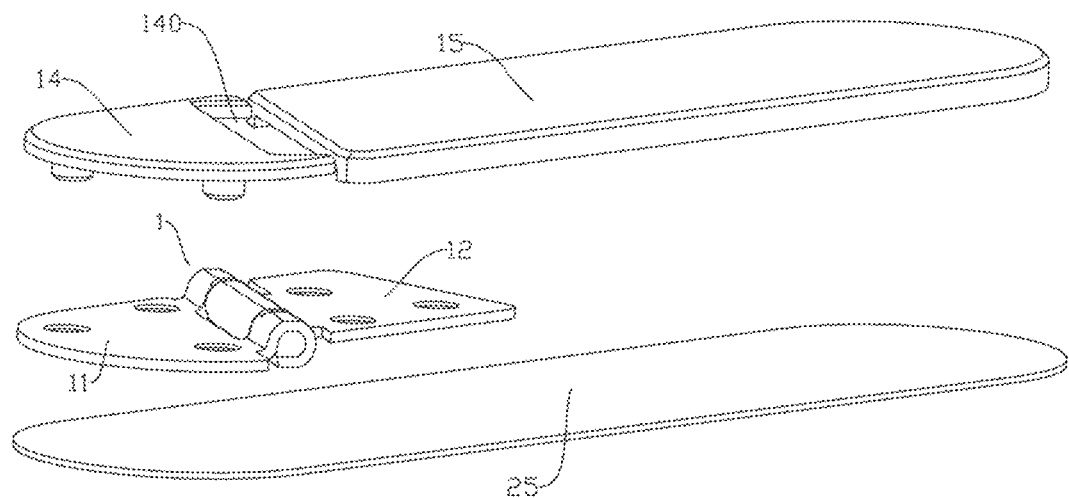
FIG. 8 is an exploded view of the electronic equipment accessory in FIG. 6.

Referring to FIGS. 6-8, an electronic equipment accessory is provided according to Embodiment 2 of the application. In this embodiment, the electronic equipment accessory is described with an electronic equipment stand as an example. The electronic equipment accessory comprises the rotating device 1 provided by Embodiment 1 of the application, a mounting member 14 and a support member 15. The mounting member 14 is connected to the first connecting member 11 in order to connect the first connecting member 11 to an electronic equipment or an electronic equipment protective case. The support member 15 is connected to the second connecting member 12 to form a stand for supporting the electronic equipment. One side of the mounting member 14 facing the second connecting member 12 defines a notch 140. The shaft 13 is received in the notch 140. The use, implementation and beneficial effects of the electronic equipment accessory can be understood with reference to Embodiment 1 of the application.

In some embodiments, the mounting member 14 and the first connecting member 11 may be formed integrally, and the support member 15 and the second connecting member 12 may be formed integrally. That is, the first connecting member 11 and the second connecting member 12 are designed according to the shape and size of an electronic equipment stand, thereby making the rotating device 1 directly form the electronic equipment stand.

Embodiment 3

Figure 9:
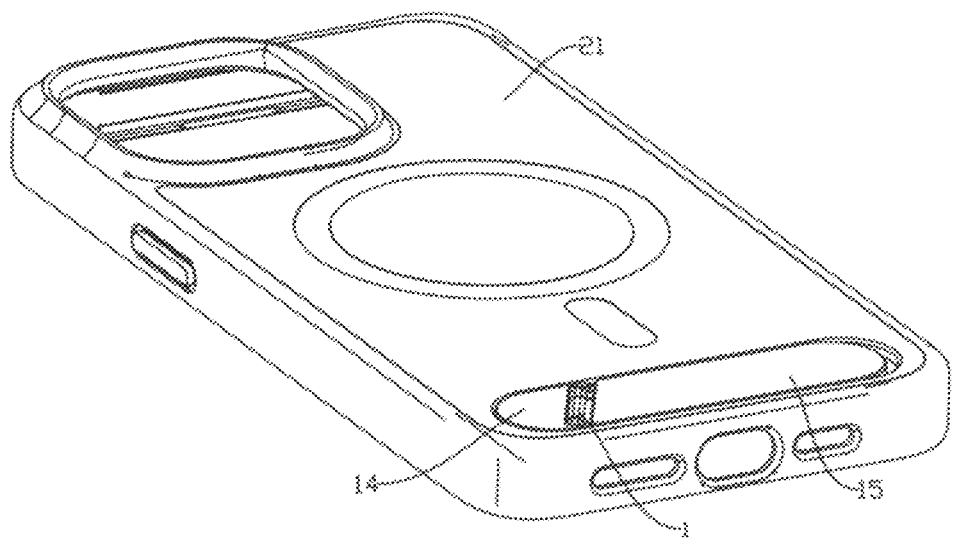
FIG. 9 is a perspective view of an electronic equipment accessory according to Embodiment 3 of the application.
Figure 10:
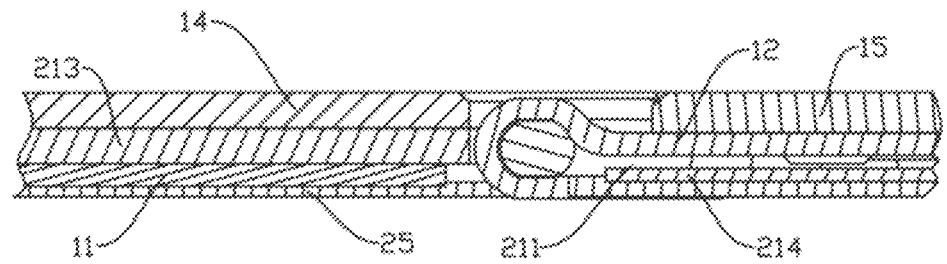
FIG. 10 is a partial sectional view of a spindle structure of the electronic equipment accessory in FIG. 9.
Figure 11:
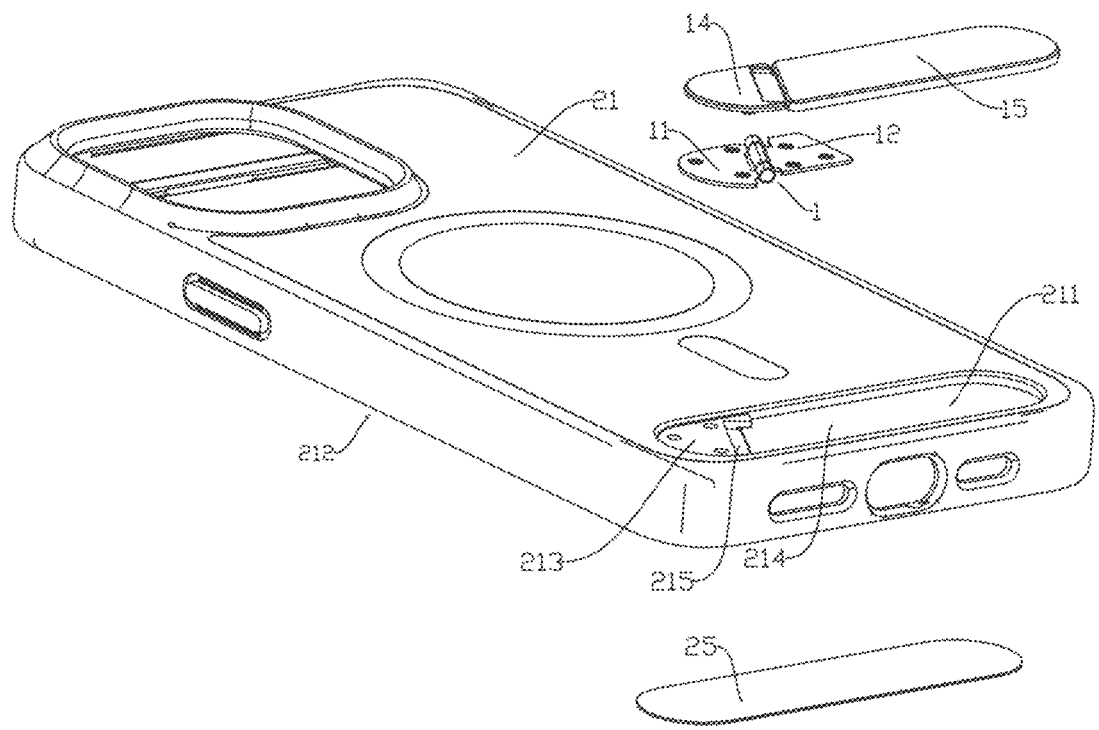
FIG. 11 is an exploded view of the electronic equipment accessory in FIG. 9.
Figure 12:
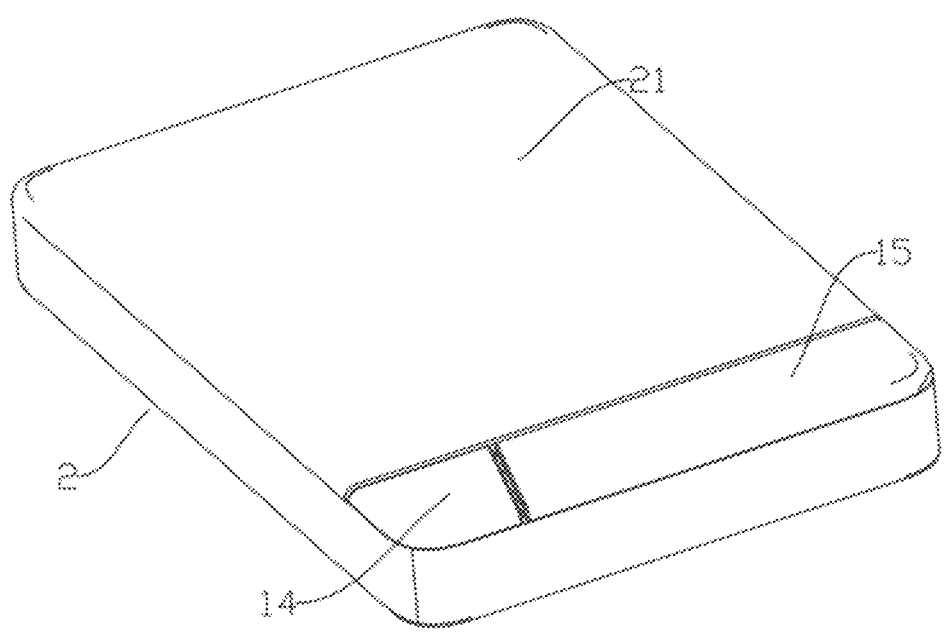
FIG. 12 is a perspective view of another electronic equipment accessory according to Embodiment 3 of the application.
Figure 13:
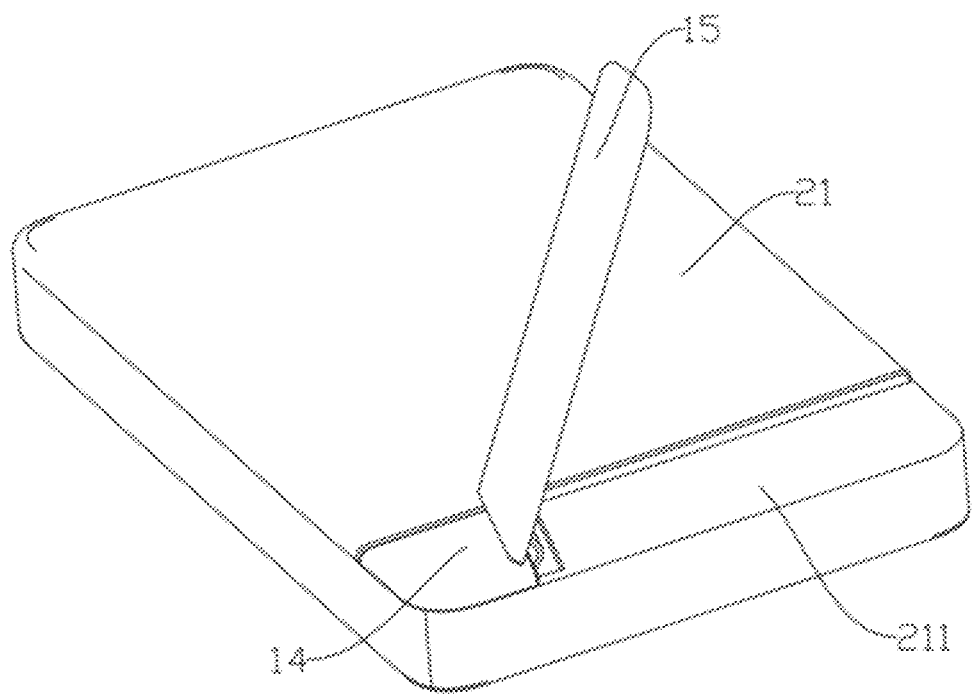
FIG. 13 is a perspective view of the electronic equipment accessory in FIG. 12, in another state.

Referring to FIGS. 9-11, Embodiment 3 of the application provides an electronic equipment accessory. The electronic equipment accessory comprises: a back panel 21, the rotating device 1 provided by Embodiment 1 of the application, a mounting member 14 and a support member 15. The back panel 21 defines a receiving groove 211. The mounting member 14 is connected to the first connecting member 11. The support member 15 is connected to the second connecting member 12. The receiving groove 211 is configured for receiving the rotating device 1, the mounting member 14 and the support member 15.

Specifically, a receiving cavity 212 is defined in one side of the electronic equipment accessory. The electronic equipment accessory, for example, further comprises a frame 22 which surrounds and is connected to the back panel 21 to cooperatively form the receiving cavity 212. The receiving groove 211, for example, is arranged on a side, away from the receiving cavity 212, of the back panel 21. The electronic equipment accessory, for example, may be an electronic equipment protective case, an electronic equipment stand, a portable power supply, a wireless charger, a bag or card holder, or the like.

Further, referring to FIGS. 10 and 11, the receiving groove 211 comprises a first bottom wall 213 and a second bottom wall 214 which are sunken inwardly relative to the outer surface of the back panel 21 in the thickness direction of the back panel 21. A through-opening 215 is formed between the first bottom wall 213 and the second bottom wall 214, and the rotating device 1 passes through the through-opening 215. The first bottom wall 213 is sandwiched between the first connecting member 11 and the mounting member 14, and the first connecting member 11 is arranged on a side, away from the receiving groove 211, of the first bottom wall 213, and the second connecting member 12 is arranged in the receiving groove 211.

Furthermore, referring to FIGS. 3 and 10, the first connection surface 1111 is in contact with the side, away from the receiving groove 211, of the first bottom wall 213. The second connection portion 121 is arranged in the receiving groove 211, and the second connection surface 1211 is located on a side, away from the second bottom wall 214, of the second connection portion 121.

Further, referring to FIGS. 7-11, the electronic equipment accessory further comprises a second attachment part 25, which corresponds to the receiving groove 211 in the receiving cavity 212. Specifically, the second attachment part 25 is, for example, an adhesive patch, which is adhered to a surface, opposite to the first connection surface 1111, of the first connection portion 111. The second attachment part 25 is configured for covering and protecting the rotating device 1.

Therefore, when the electronic equipment accessory is provided with the rotating device 1 shown in FIGS. 3 and 4, a layered structure shown in FIG. 10 may be formed. Wherein, the first connecting member 11 is arranged on a lower side of the first bottom wall 213, and the second connecting member 12 is arranged on an upper side of the second bottom wall 214. In this way, the connection stability of the rotating device 1 and the electronic equipment accessory is improved, a rotary joint between the mounting member 14 and the support member 15 can be hidden in the back panel 21, and the thickness of the back panel 21 does not need to be increased. The support member 15 is rotatable with respect to the electronic equipment accessory between an extended position and a closed position. Preferably, at the closed position, the support member 15 is fully received in the receiving groove 211, and the support member 15 and the back panel 21 are coplanar. At the extended position, the support member 15 is rotated out of the receiving groove 211 and can cooperate with the frame of the electronic equipment accessory to support an electronic equipment on a support surface.

Referring to FIGS. 12-15, Embodiment 3 of the application further provides an alternative electronic equipment accessory with a different appearance. The outline of the electronic equipment accessory shown in FIGS. 12-15 is different from the outline of the electronic equipment accessory shown in FIGS. 9-11. The electronic equipment accessory shown in FIGS. 12-15 may be a portable power supply or a protective case configured for protecting a portable power supply such as a power bank, and the electronic equipment accessory shown in FIGS. 9-11 may be used for protecting electronic equipment such as a smartphone or a tablet.

Figure 14:
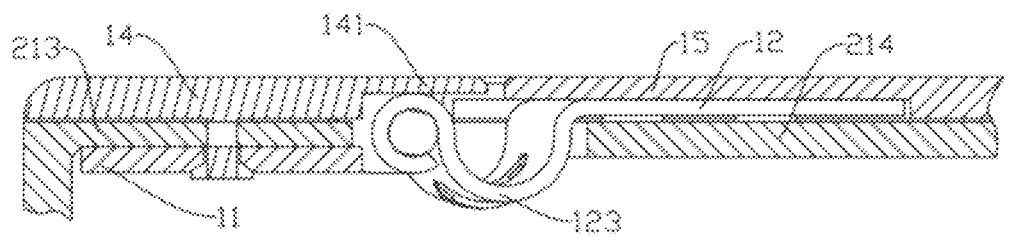
FIG. 14 is a sectional view of a spindle structure of the electronic equipment accessory in FIG. 12.
Figure 15:
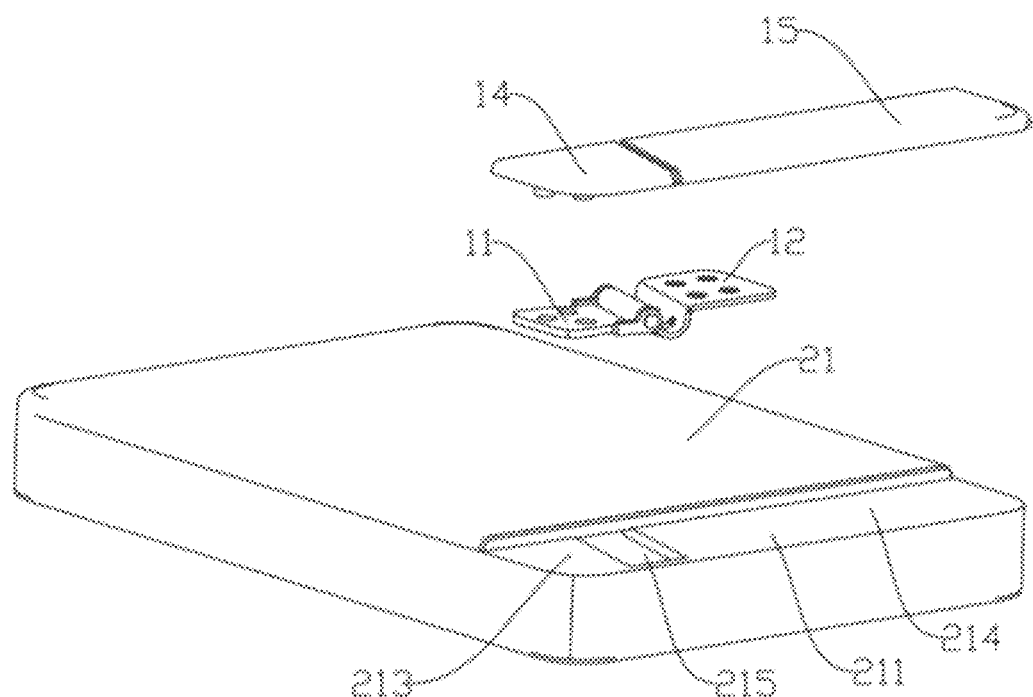
FIG. 15 is an exploded view of the electronic equipment accessory in FIG. 12.

Further, referring to FIG. 14, the mounting member 14 comprises an extension part 141 which extends towards the support member 15 and stretches across the shaft 13. The second connecting member 12 has a bent portion 123 on a side close to the shaft 13, and the bent portion 123 bends towards a side away from the extension part 141. The extension part 141 may cover the shaft 13, a connection structure between the first rotating member 11 and the shaft 13, as well as a connection structure between the second connecting member 12 and the shaft 13, such that the shaft 13 is prevented from being exposed to the outside of the mounting member 14 and the support member 15. To ensure that the mounting member 14 and the support member 15 can rotate relative to each other smoothly, the bent portion 123 of the second rotating member 12 may keep away from the extension part 141.

Embodiment 4

Figure 16:
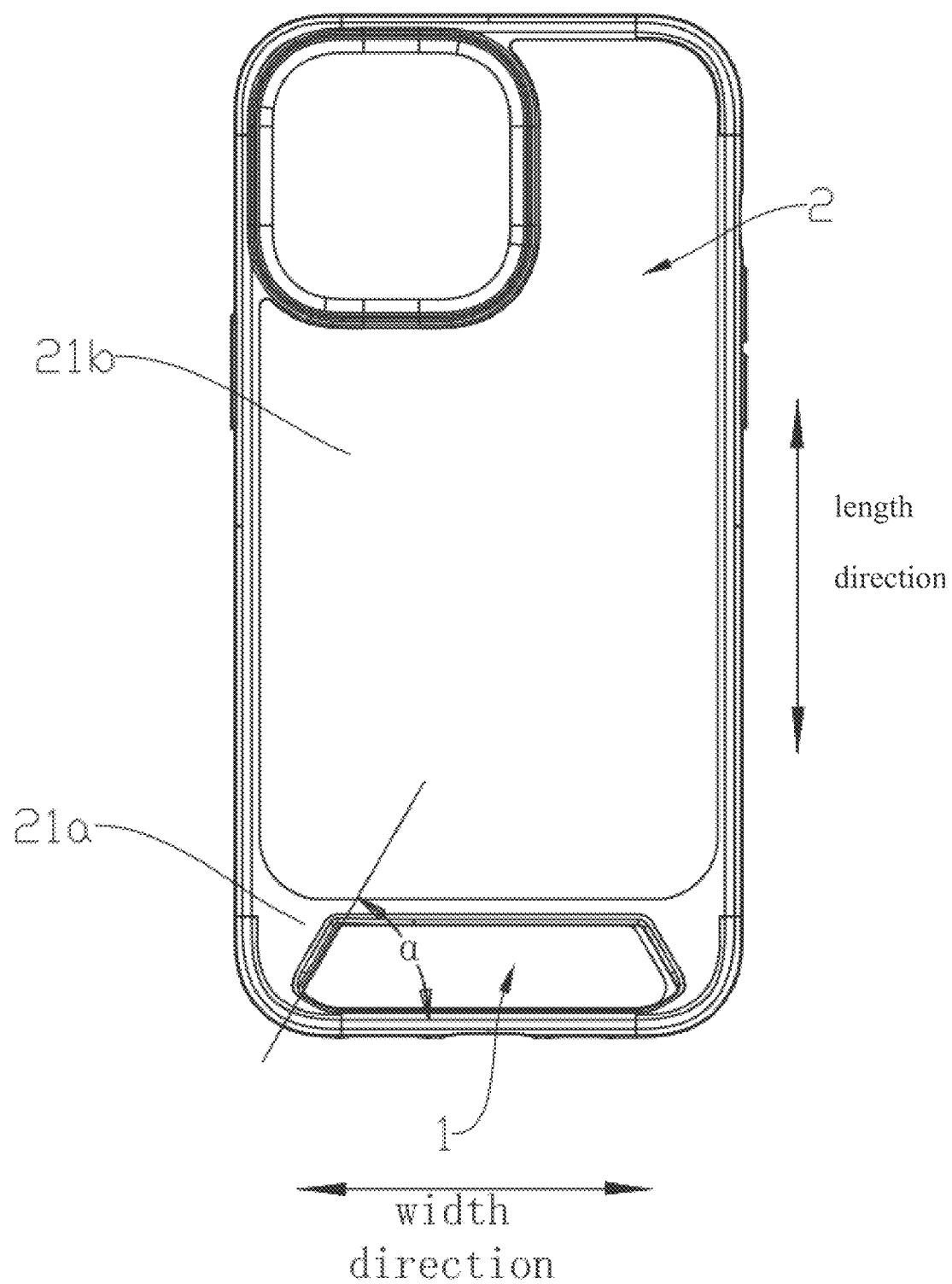
FIG. 16 is a back view of an electronic equipment accessory according to Embodiment 4 of the application.
Figure 17:
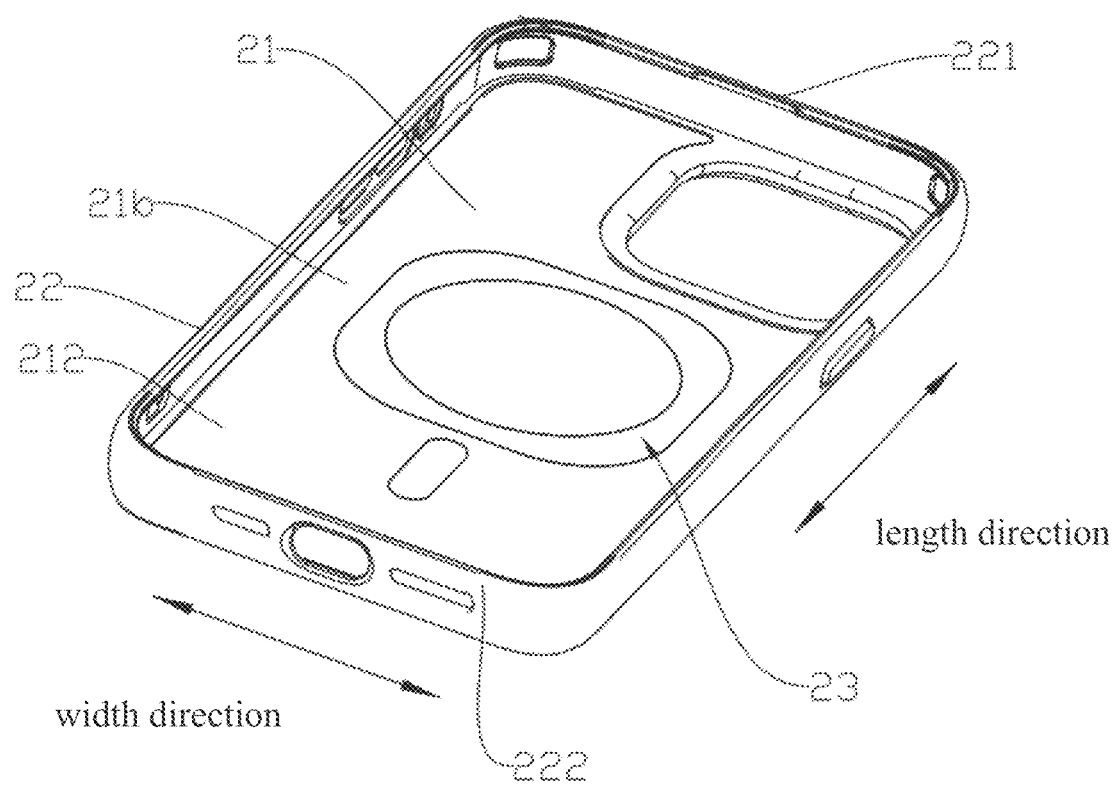
FIG. 17 is a perspective view of the electronic equipment accessory in FIG. 16, from another perspective.

Referring to FIGS. 16-17, Embodiment 4 of the application provides an electronic equipment accessory, which is different from the electronic equipment accessory in the above embodiments mainly in the structure of the rotating device 1. In this embodiment, the electronic equipment accessory is described with a mobile phone protective case as an example. The electronic equipment accessory comprises an accessory body 2, a rotating device 1 and a support member 15. The rotating device 1 and the support member 15 cooperatively form a stand. The accessory body 2 comprises a back panel 21 and a frame 22 connected to the back panel 21. In this embodiment, the frame 22 is connected to the periphery of the back panel 21 to cooperatively form a receiving cavity 212 for receiving electronic equipment. The electronic equipment is, for example, a mobile phone, a tablet, or other portable electronic terminals. For the sake of a brief description, the electronic equipment is described in the following embodiments with a mobile phone as an example, and correspondingly, the electronic equipment accessory is a mobile phone protective case unit.

Figure 18:
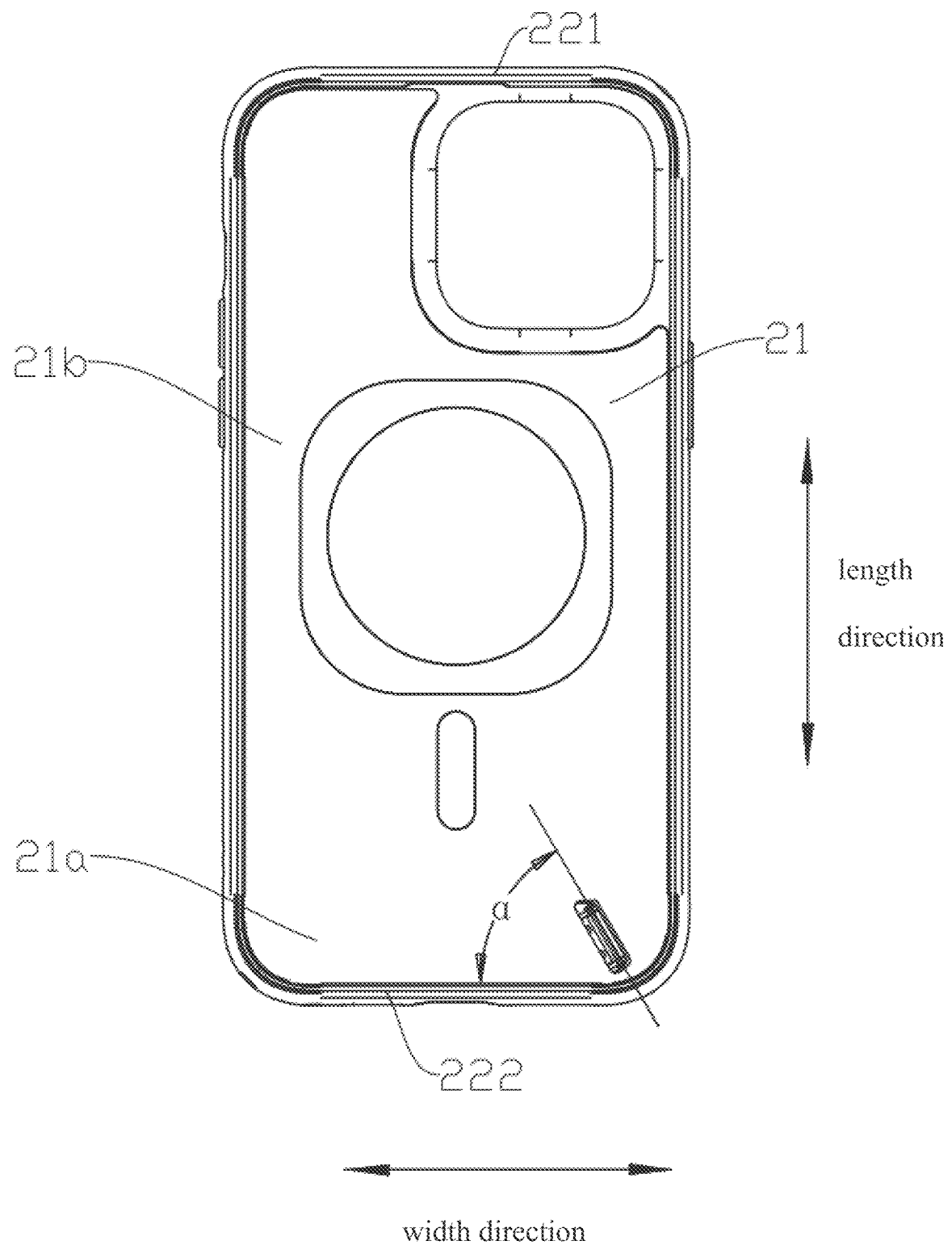
FIG. 18 is a front view of the electronic equipment accessory in FIG. 16.
Figure 19:
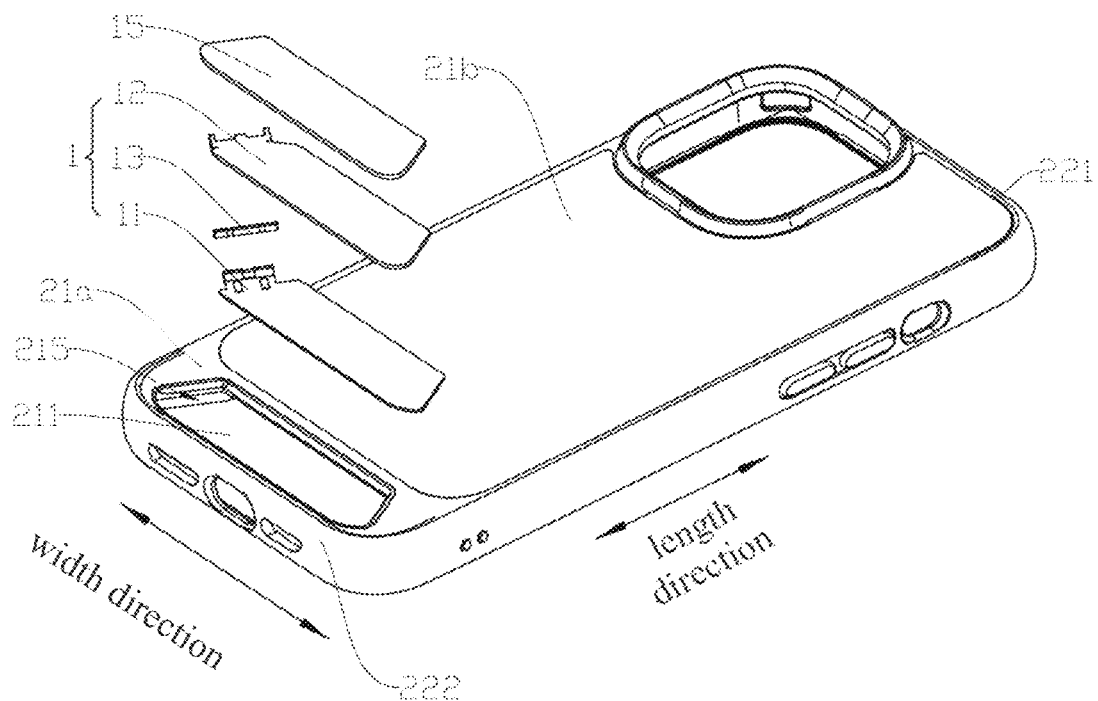
FIG. 19 is an exploded view of the electronic equipment accessory in FIG. 16, from another perspective.
Figure 22:
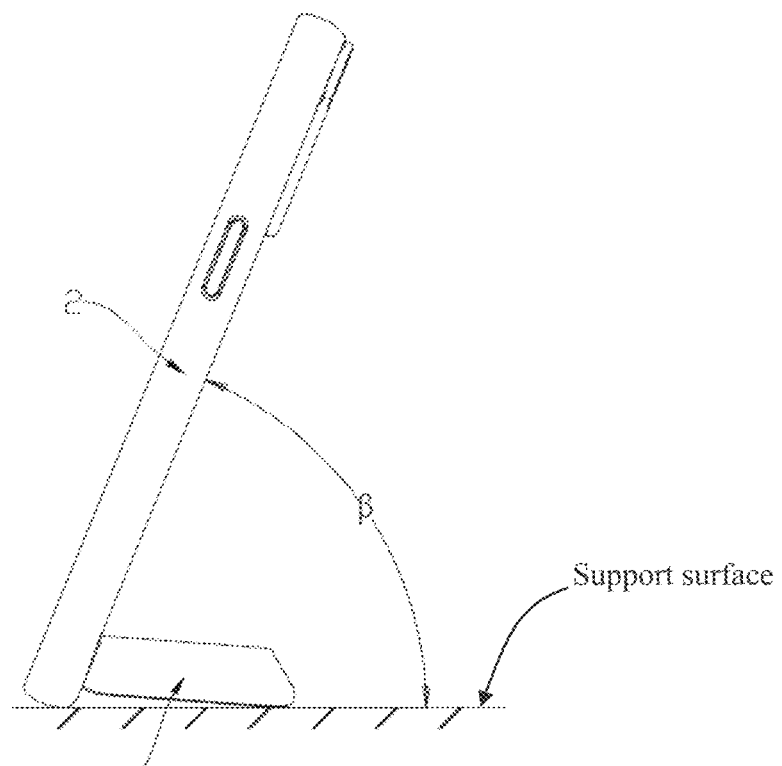
FIG. 22 is a side view of the electronic equipment accessory in FIG. 21 in a case where the electronic equipment accessory is supported on a support surface by means of the stand.

Referring to FIGS. 17-19, the frame 22 comprises a top wall 221 and a bottom wall 222 which are oppositely arranged in a length direction of the accessory body 2, and generally, the frame 22 further comprises a left sidewall and a right sidewall which are oppositely arranged in a width direction of the accessory body 2. The back panel 21 comprises a first area 21a and a second area 21b in the length direction of the accessory body 2, the first area 21a is adjacent to the bottom wall 222, and the second area 21b is located between the first area 21a and the top wall 221. A receiving groove 211 is formed in the first area 21a and is located in a side of the back panel 21 opposite to the receiving cavity 212. A length direction of the receiving groove 211 is parallel to the width direction of the accessory body 2, in other words, the length direction of the receiving groove 211 is consistent with the width direction of the accessory body 2. The rotating device 1, which is mounted to the back panel 211, comprises a first connecting member 11, a second connecting member 12 and a shaft 13. The support member 15 is connected to the second connecting member 12. The shaft 13 is inclined with respect to the bottom wall 222. For example, as shown in FIGS. 16 and 18, an angle α, which is formed between an axial direction of the shaft 13 and the bottom wall 222, is an acute angle (for example, the preset acute angle A in other embodiments), and specifically, the angle α is an angle formed between the axial direction of the shaft 13 and the length direction of the bottom wall 222, i.e., the width direction of the accessory body 2. In this embodiment, by mounting the rotating device 1 in the first area 21a close to the bottom wall 222 of the accessory body 2, the second area 21b of the back panel 21 may have a larger function setting region, in which functional components such as a magsafe magnetic attraction component, a fill-in light, a card case or a ring holder may be installed. In addition, to fulfil a suitable support angle of a stand close to the bottom wall 222 of the accessory body 2, the shaft 13 of the rotating device 1 is inclined with respect to the bottom wall 222, for example, when the angle α is 60°, an inclination angle β of the back panel 21 of the accessory body 2 with respect to a support surface is 68° (as shown in FIG. 22). Preferably, the angle α is greater than or equal to 45° and less than or equal to 75°, such that the inclination angle β of the back panel 21 of the accessory body 2 with respect to the support surface may be greater than or equal to 60° and less than or equal to 75° to adapt to the using habits of most users. It should be noted that the support surface typically refers to a plane cooperatively defined by a support point at an end, away from the back panel 21, of the support member 15 and another support point on the bottom wall 222 when the support member 15 (the second connecting member 12 which acts as a support member in a case where the support member 15 is omitted) is in a support state with respect to the accessory body 2; and the support points refer to contact points between the support member 15 and a support surface (such as a surface of a desk) as well as between the bottom wall 222 and the support surface. The support member 15 shown in FIG. 22 can vertically support the accessory body 2 on the support surface. It should be noted that the support member 15 in this embodiment not only can vertically support the accessory body 2, but also can horizontally support the accessory body 2, that is, the length direction of the accessory body 2 parallel to the support surface. It should also be noted that, in some embodiments, the receiving groove 211 defined in the first area 21a may be omitted, and correspondingly, the support member 15 is protrusively arranged at the first area 21a.

Figure 20:
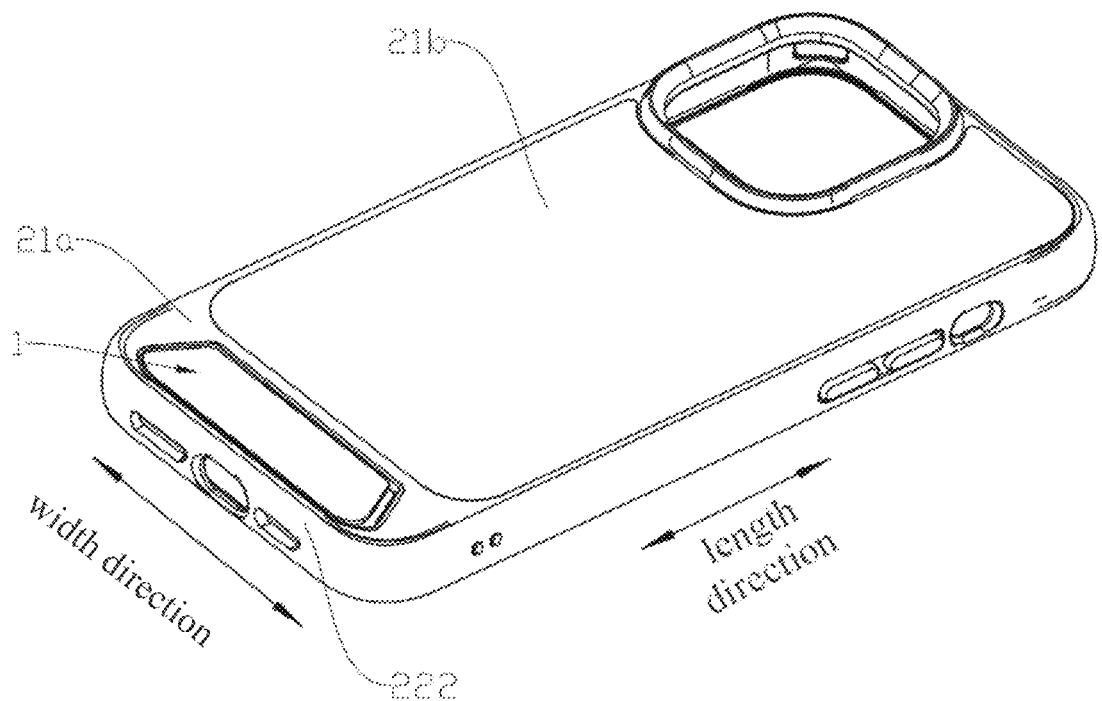
FIG. 20 is a perspective view of the electronic equipment accessory in FIG. 16 in a case where a stand is in a folded state.
Figure 21:
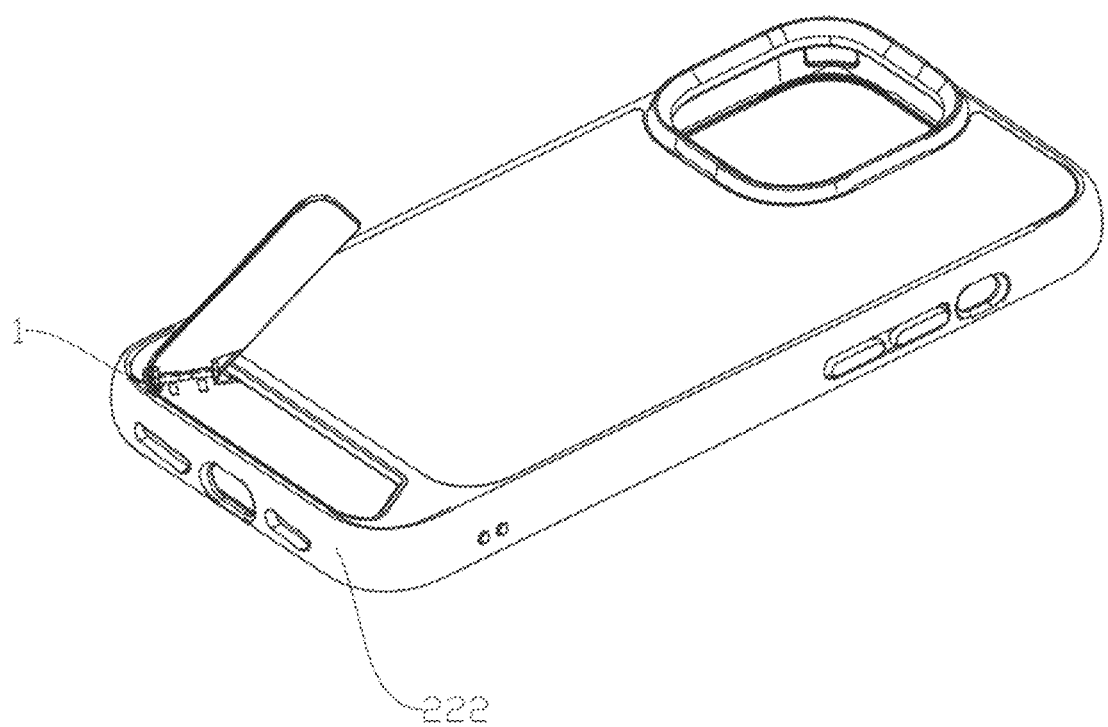
FIG. 21 is a perspective view of the electronic equipment accessory in FIG. 20 in a case where the stand is in a support state.

In some embodiments, referring to FIGS. 19-22, the first connecting member 11 is fixedly arranged in the receiving groove 211, the second connecting member 12 is rotatably connected to the first connecting member 11 by means of the shaft 13, and the second connecting member 12 is switchable with respect to the first connecting member 11 between a folded state (shown in FIG. 20) and a support state (shown in FIG. 21). With reference to FIGS. 19 and 20, in the folded state, the second connecting member 12 and the support member 15 are at least partly received in the receiving groove 211. With reference to FIGS. 19, 21 and 22, in the support state, the second connecting member 12 and the support member 15 are rotated away from the receiving groove 211, such that the accessory body 2 can be supported by the support member 15 in an oblique state. In other embodiments, the first connecting member 11 of the rotating device 1 may be omitted, and the second connecting member 12 is fixed to the back panel 21 of the accessory body 2 by means of the shaft 13. The support member 15 may be omitted, and the accessory body 2 can be supported by the second connecting member 12 which acts as a support member.

In some embodiments, referring to FIGS. 19 and 23-25, two second rotary connection portions 122 and a limiting portion 124 located between the two second rotary connection portions 122 are arranged at one end of the second connecting member 12, and the two second rotary connection portions 122 each defines a coupling hole 1220 matching with the shaft 13. For instance, the shaft 13, for example, has two opposite flat surfaces and two opposite arc surfaces connected between the two flat surfaces; correspondingly, the coupling hole 1220 has two opposite flat side walls and two opposite arc side walls connected between the two flat side walls, such that the shaft 13 can be mounted and fitted in the coupling holes 1220 to realize a connection between the shaft 13 and the coupling portions 122 and to allow the second connecting member 12 to be rotatable with the shaft 13. In addition, a first rotary connection portion 112 is arranged at one end of the first connecting member 11. The first rotary connection portion 112 comprises a first stop surface 1121 and a sleeving hole 1120 in which the shaft 13 is fitted. For instance, an opening is formed in the circumferential wall of the sleeving hole 1120. That is, the sleeving hole 1120 is not completely closed in the circumferential direction, which allows the sleeving hole 1120 to expand. When the second connecting member 12 of the rotating device 1 is rotated outwards to be unfolded, the shaft 13 is driven to rotate to thereby drive the first rotary connection portion 112 to expand to some extent and deform elastically. When the second connecting member 12 rotates inwards (in a direction close to the first connecting member 11) by a certain distance, the elastic restoring force of the first rotary connection portion 112 will drive the shaft 13 to quickly rotate to its final position to thereby make the second connecting member 12 automatically cover the first connecting member 11. That is, the shaft 13 is rotatably fitted in the first rotary connection portion 112. In addition, it should be noted that after the rotating device 1 is mounted in the receiving groove 211, the first connecting member 11 remains stationary with respect to the receiving groove 211 when the second connecting member 12 rotates into or away from the receiving groove 211. The first connecting member 11 may be secured in the receiving groove 211 with an adhesive or in other suitable ways as long as the first connecting member 11 can be fixed in the receiving groove 211.

Based on the above description, the shaft 13 is mounted in the coupling holes 1220 and the sleeving hole 1120 and the first rotary connection portion 112 is located between the two second rotary connection portions 122, such that the second connecting member 12 and the first connecting member 11 are rotatably connected to each other. The limiting portion 124 cooperates with the first stop surface 1121 to define the maximum rotation angle of the second connecting member 12 with respect to the first connecting member 11, that is, the second connecting member 12 comes in contact with the first stop surface 1121 when rotating to be unfolded to the maximum angle, such that the second connecting member 12 cannot be further unfolded anymore.

Figure 23:
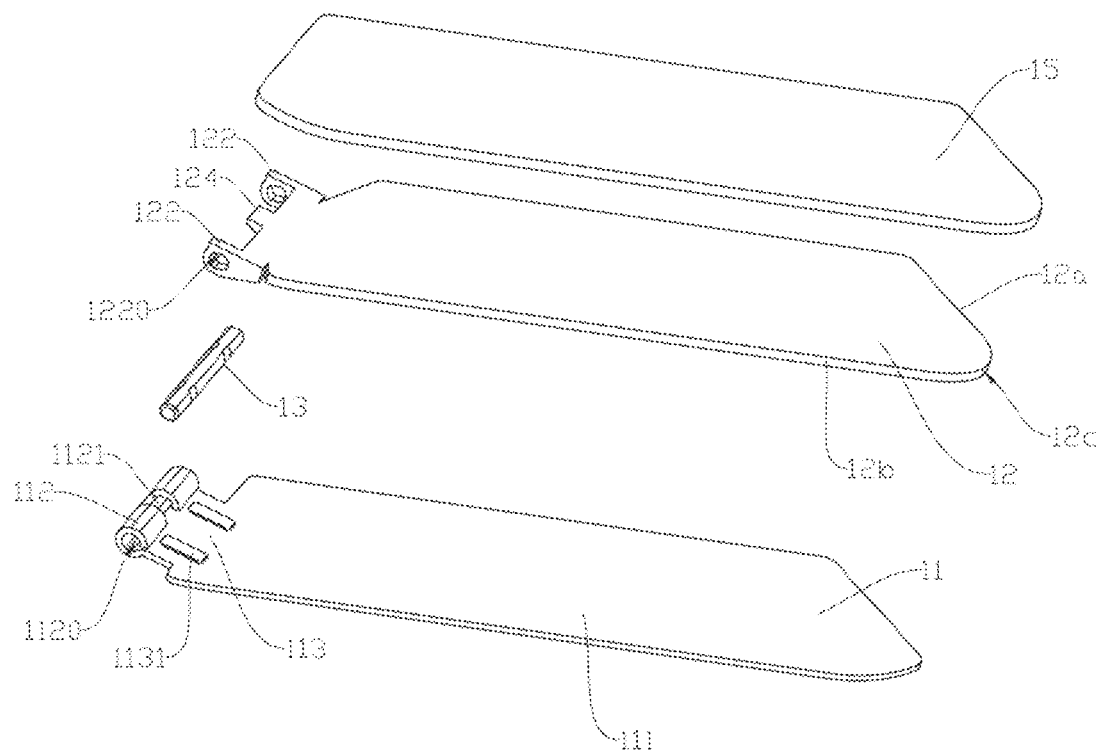
FIG. 23 is an enlarged and exploded perspective structural view of the stand in the electronic equipment accessory in FIG. 20.
Figure 24:
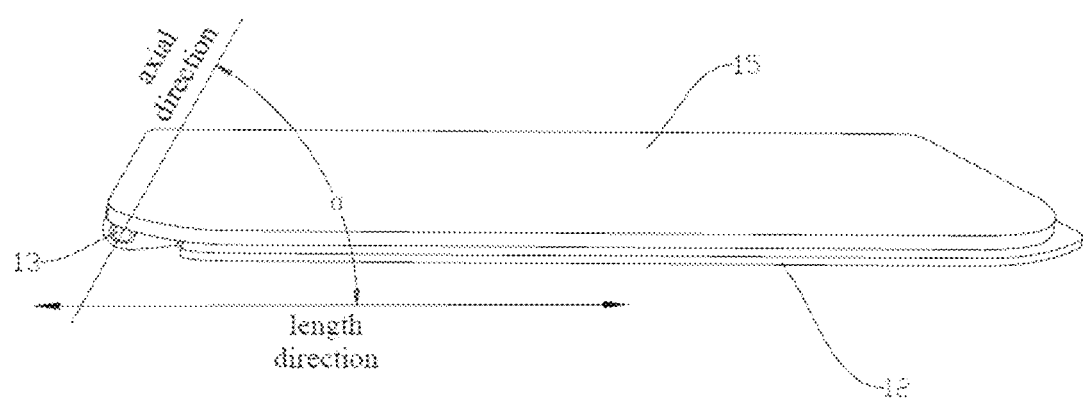
FIG. 24 is an enlarged view in a case where the stand in FIG. 23 is in a folded state.
Figure 25:
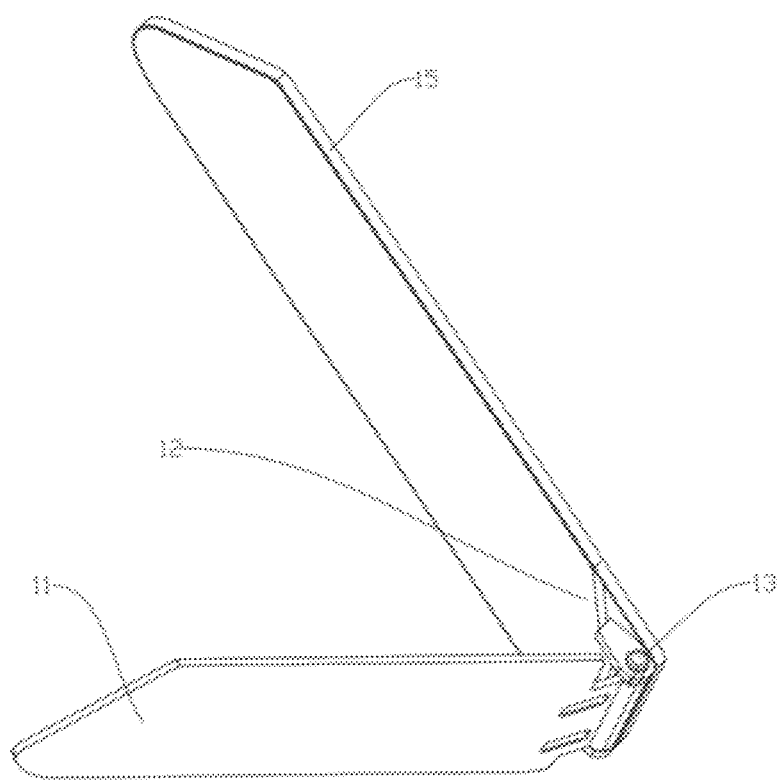
FIG. 25 is an enlarged perspective structural view in a case where the stand in FIG. 24 is in a support state.

In some embodiments, as shown in FIG. 23, the first connecting member 11 comprises a first connection portion 111 and an extension portion 113 connected between the first rotary connection portion 112 and the first connection portion 111. Reinforcing ribs 1131 are arranged on the extension portion 113. The reinforcing ribs 1131 can effectively prevent deformation of the extension portion 113.

In some embodiments, referring to FIGS. 18 and 19, a through-opening 215 penetrating through the back panel 21 is formed in an end, close to the shaft 13, of the receiving groove 211 to function as an avoidance space. The through-opening 215 is arranged to better prevent interference and friction between the second connecting member 12 and the back panel 21 when the second connecting member 12 rotates.

In some embodiments, as shown in FIGS. 19 and 20, the support member 15 is fixedly arranged on a side, away from the first connecting member 11, of the second connecting member 12. The support member 15 can improve the overall aesthetics of the electronic equipment accessory. In addition, to ensure that the electronic equipment accessory can be comfortably held, a side, away from the second connecting member 12, of the support member 15 will not protrude out of the receiving groove 211 and is preferably flush with the opening end of the receiving groove 211 when the rotating device 1 is in the folded state.

In some embodiments, referring to FIGS. 21 and 23, the second connecting member 12 comprises a first edge 12a away from the shaft 13 and a second edge 12b adjacent to the first edge 12a, wherein the second edge 12b is adjacent to the bottom wall 222 of the frame 22, and an arc edge 12c is arranged at a joint between the first edge 12a and the second edge 12b. By means of the arc edge 12c, the electronic equipment accessory can be supported on an uneven surface, that is, any one of points on the arc edge 12c may function as a support point in contacting with a support surface. In other embodiments, the first edge 12a may be configured as an arc edge to replace the arc edge 12c arranged between the first edge 12a and the second edge 12b.

Figure 26:
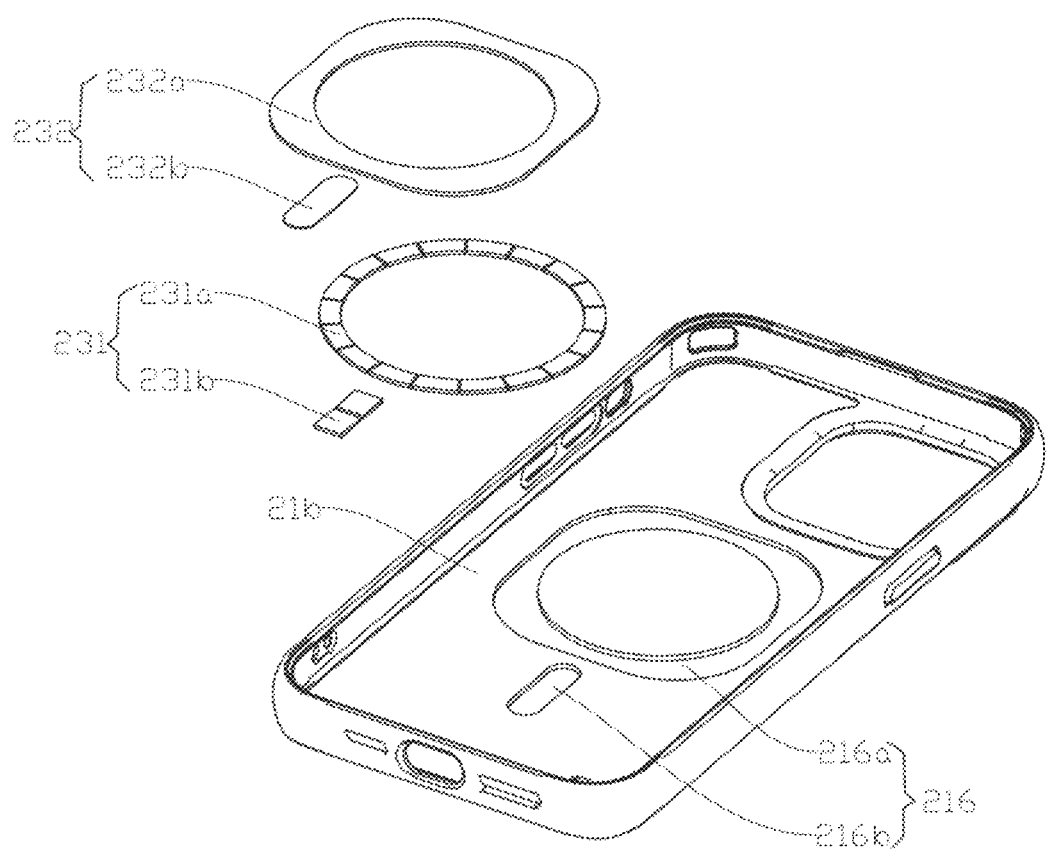
FIG. 26 is an exploded perspective structural view of the electronic equipment accessory in FIG. 17.

In some embodiments, as shown in FIG. 17, a functional component such as a magnetic attraction component 23 is arranged in the second area 21b of the back panel 21, and other functional components such as a fill-in light, a card case and a finger ring grip may also be arranged in the second area 21b of the back panel 21. In addition, it can be understood that, a camera hole is generally also formed in the second area 21b to expose a mobile phone camera when the mobile phone is received in the receiving cavity 212 of the accessory body 2. Further, as shown in FIGS. 17 and 26, a mounting groove 216 is formed in the second area 21b of the back panel 21. The magnetic component 23 comprises a magnet 231 and a magnet cover 232, the magnet 231 is received in the mounting groove 216, and the magnet cover 232 covers the mounting groove 216 to fix the magnet 231 between the mounting groove 216 and the magnet cover 232. Specifically, the mounting groove 21 comprises a ring-shaped mounting groove 216a and a strip-shaped mounting groove 216b spaced apart from the ring-shaped mounting groove 216a, the magnet 231 comprises a ring-shaped magnet 231a and an alignment magnet 231b, the magnet cover 232 comprises a ring-shaped cover 232a and a strip-shaped cover 232b, the ring-shaped magnet 231a is received in the ring-shaped mounting groove 216a, the ring-shaped cover 232a covers the ring-shaped mounting groove 216a to fix the ring-shaped magnet 231a between the ring-shaped mounting groove 216a and the ring-shaped cover 232a, the alignment magnet 231b is received in the strip-shaped mounting groove 216b, and the strip-shaped cover 232a covers the strip-shaped mounting groove 216b to fix the alignment magnet 231b between the strip-shaped mounting groove 216b and the strip-shaped cover 232b. Typically, a groove for receiving the magnet 231 is formed in a back side of the magnet cover 232, the ring-shaped magnet 231a is configured for attracting an external accessory and generally formed by a plurality of segmented magnets which are arranged at interval in a ring shape, and the alignment magnet 231b is a magnet used for alignment. Furthermore, the second area 21b of the back panel 21 may be transparent, such that the aesthetics can be improved, and the position of the magnet 231 can be displayed to allow users to quickly align the magnet 231b and an accessory to be attracted.

In addition, it should be noted that, in other embodiments, the rotating device 1 provided by this embodiment of the application, as an independent component, may be directly fixed to the back side of electronic equipment such as the back side of a mobile phone to function as a stand, such that the mobile phone can be supported on a support surface obliquely, vertically or horizontally. In this application scenario, referring to FIGS. 23-25, the rotating device 1 comprises the first connecting member 11, the second connecting member 12 and the shaft 13, and further comprises the support member 15. The first connecting member 11 is fixedly connected to the back side of the electronic equipment, for example, with an adhesive or in other ways to realize a fixed connection between the rotating device 1 and the electronic equipment. The second connecting member 12 is rotatably connected to the first connecting member 11 by means of the shaft 13 such that the second connecting member 12 is rotatable relative to the first connecting member 11 about a rotation axis defined by the axis of the shaft 13. The support member 15 is fixedly arranged on a side, away from the first connecting member 11, of the second connecting member 12, an angle α formed between an axial direction of the shaft 13 and a length direction of the rotating device 1 is an acute angle and is preferably an acute angle which is greater than or equal to 45° and less than or equal to 75°. Further, an end, close to the shaft 13, of the first connecting member 11 is provided with, for example, a first rotary connection portion 112, and the first rotary connection portion 112 has a first stop surface 1121 and a sleeving hole 1120 in running fit with the shaft 13. An end, close to the shaft 13, of the second connecting member 12 is provided with, for example, two second rotary connection portions 122 and a limiting portion 124 located between the two second rotary connection portions 122. The two second rotary connection portions 122 each defines a coupling hole 1220 matching with the shaft 13. The shaft 13 is mounted in the coupling holes 1220 and the sleeving hole 1120 and the first rotary connection portion 112 is located between the two second rotary connection portions 122 to realize a rotatable connection between the second connecting member 12 and the first connecting member 11. The limiting portion 124 cooperates with the first stop surface 1121 to define the maximum rotation angle of the second connecting member 12 with respect to the first connecting member 11. In some embodiments, the second connecting member 12 comprises a first edge 12a away from the shaft 13 and a second edge 12b adjacent to the first edge 12a. An arc edge 12c is arranged at a joint between the first edge 12a and the second edge 12b. The electronic equipment accessory can be supported on an uneven support surface by means of the arc edge 12c, that is, any one of points in the arc edge 12c may function as a support point. Alternatively, the first arc edge 12a is an arc edge which can function as a support edge to replace the arc edge 12c arranged between the first edge 12a and the second edge 12b.

Embodiment 5

Figure 27:
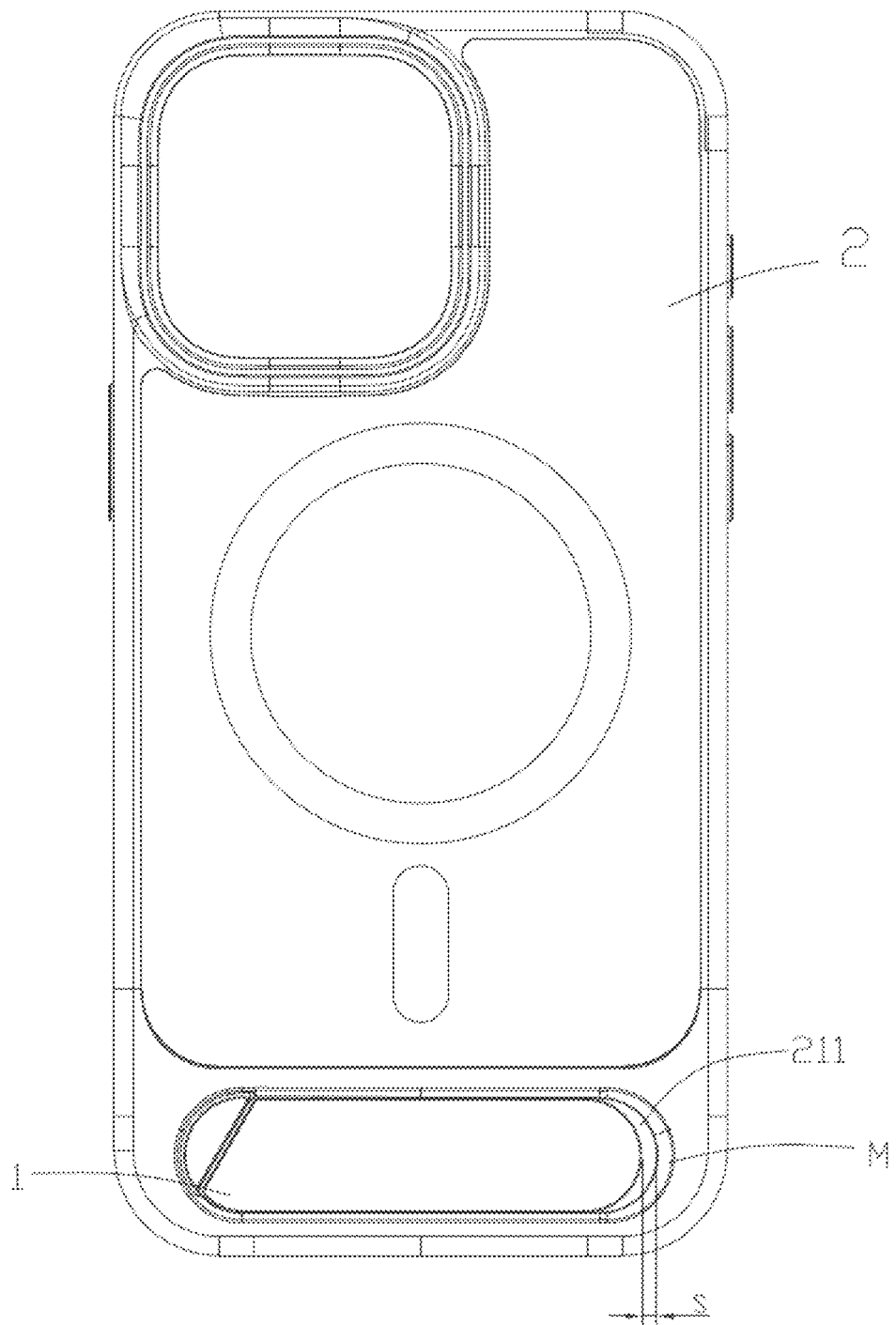
FIG. 27 illustrates an electronic equipment accessory according to Embodiment 5 of the application.
Figure 28:
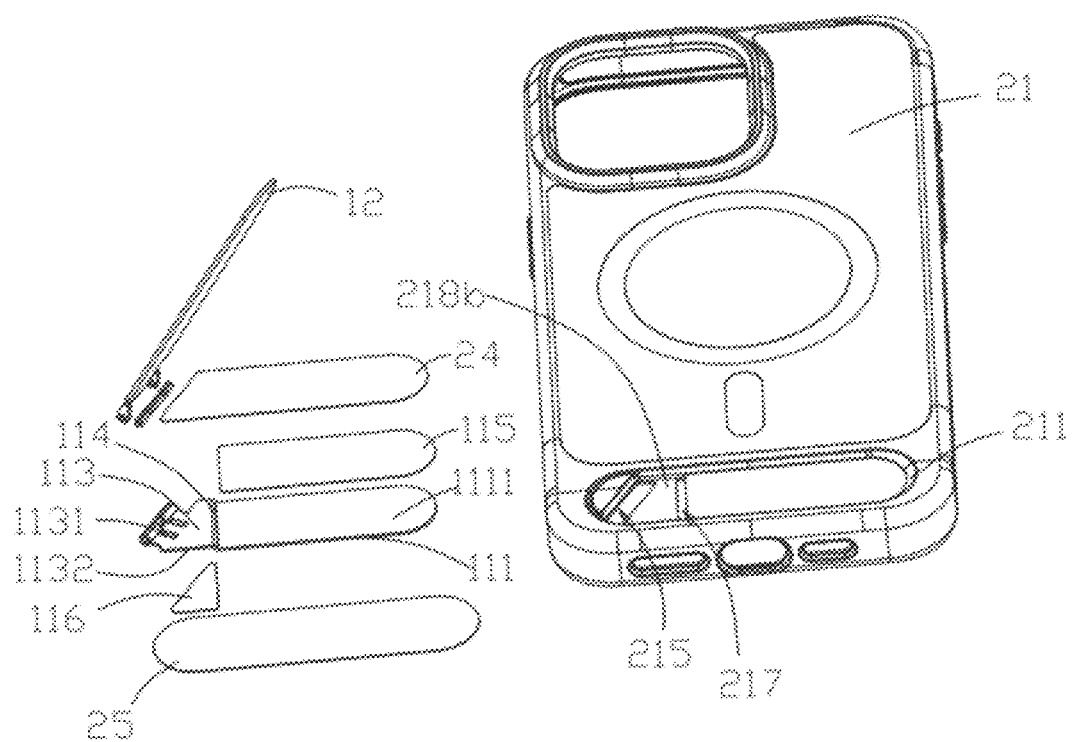
FIG. 28 is an exploded view of the electronic equipment accessory in FIG. 27.
Figure 29:
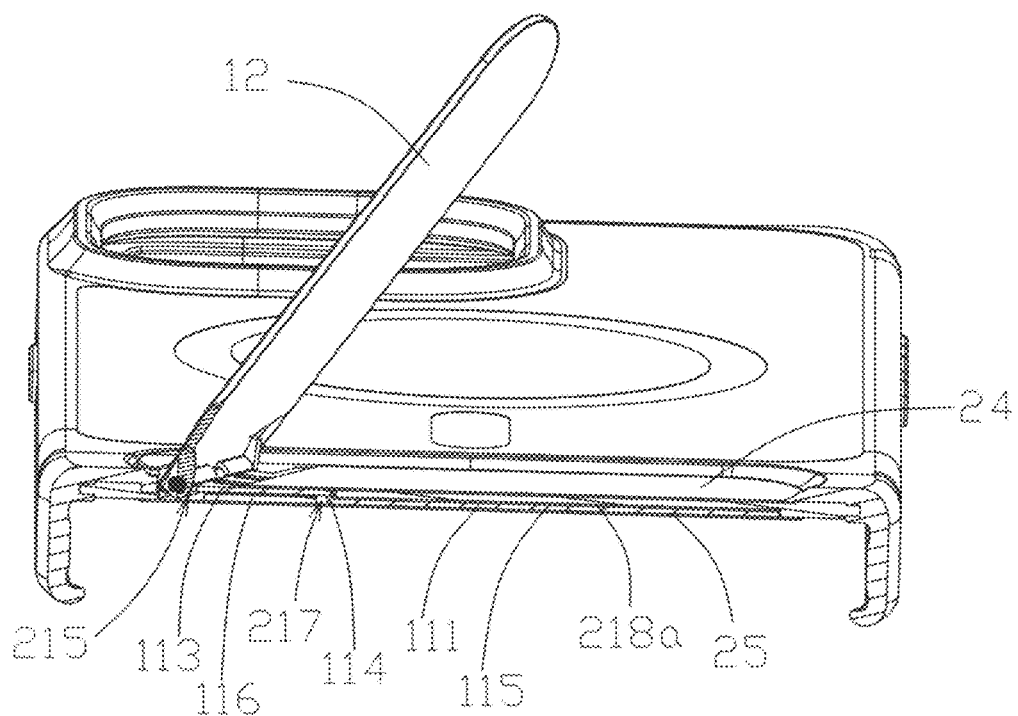
FIG. 29 is a sectional view of the electronic equipment accessory in FIG. 27, wherein a rotating device of the electronic equipment accessory is in an unfolded state.

Referring to FIGS. 27-29, Embodiment 5 of the application provides a rotating device 1 and a mobile phone protective case with the rotating device 1. This embodiment is different from the above embodiments mainly in the structure of the rotating device 1. In this embodiment, the rotating device 1 is formed as a stand. The rotating device 1 of the mobile phone protective case comprises a first connecting member 11 and a second connecting member 12. The first connecting member 11 is fixedly secured to the mobile phone protective case. One end of the second connecting member 12 is rotatably connected to the first connecting member 11. The second connecting member 12 is rotatable between a folded state and an extended state. In the folded state, the second connecting member 12 is stacked on the first connecting member 11. In the extended state, the second connecting member 12 is rotated away from the first connecting member 11 and an included angle is formed between the second connecting member 12 and the mobile phone protective case such that the second connecting member 12 can act as a support member to support the mobile phone protective case together with a mobile phone mounted in the mobile phone protective case on a support surface. The first connecting member 11 comprises the first connection surface 1111 which is connected to the mobile phone protective case. The first connection surface 1111 is a surface of the first connecting member 11 which is orientated toward the second connecting member 12 when the rotating device 1 is in the folded state.

Compared with the prior art, one end of the second connecting member 12 is rotatably connected to the first connecting member 11, such that the second connecting member 12 may support the mobile phone protective case at different angles by means of the rotatable connection. When the rotating device 1 is in the folded state, the second connecting member 12 is stacked on the first connecting member 11, the first connection surface 1111 is the surface, facing the second connecting member 12, of the first connecting member 11 (when the rotating device 1 is in the folded state), the mobile phone protective case is connected to the first connecting member 11 by means of the first connection surface 1111, and the first connecting member 11 can be inserted into the interior of the mobile phone protective case to realize connection, which is different from an existing configuration that a stand is connected to an outer surface of the mobile phone protective case. Thus, the second connecting member 12 of the rotating device 1 can be tightly and firmly connected to the mobile phone protective case and is unlikely to fall from the mobile phone protective case. The reliability of the second connecting member 12 acting as a support member and the mobile phone protective case is improved. In addition, the rotating device 1 may be used for supporting a portable power supply, a charge, a mobile phone, a tablet, a reader, a display, an earphone case, and other electronic equipment or electronic equipment accessories.

Figure 30:
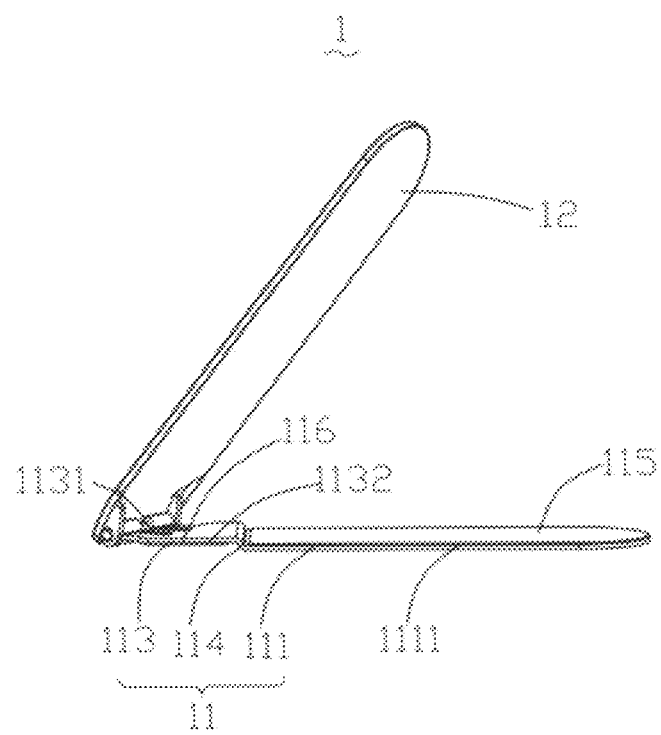
FIG. 30 is a schematic view in case where a rotating device of the electronic equipment accessory in FIG. 27 is in an unfolded state.
Figure 31:
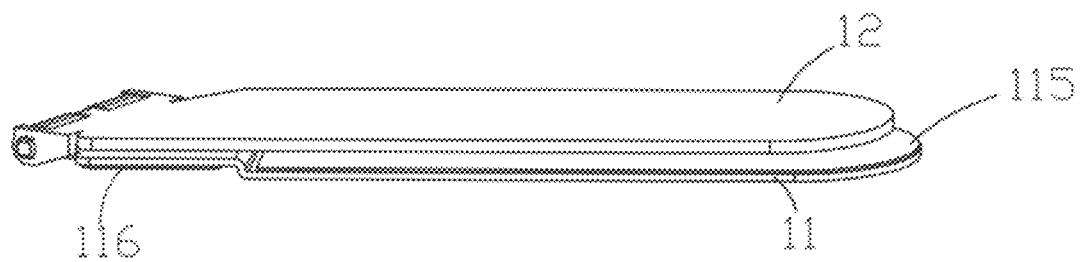
FIG. 31 is a schematic view in a case where the rotating device in FIG. 30 is in a folded state.

Referring to FIGS. 28-30, according to the rotating device 1 in this embodiment of the application, the first connecting member 11 comprises the first connection portion 111, and the first connection surface 1111 is a surface, orientated toward the second connecting member 12, of the first connection portion 111 when the rotating device is in the folded state. Specifically, the first connection surface 1111 is arranged on the first connection portion 111, and the first connection portion 111 is connected to the electronic equipment accessory for example a mobile phone protective case by means of the first connection surface 111, and the first connection portion 111 of the first connecting member 11 can be inserted into the interior of the electronic equipment accessory to realize connection such that the second connecting member 12 can be tightly and firmly connected to the electronic equipment accessory and is unlikely to fall from the external electronic equipment, thus improving the reliability of the second connecting member 12 acting as a support member and the electronic equipment accessory.

The first connection surface 1111 may be connected to the electronic equipment accessory by at least one of adhesive connection, magnetic attraction connection and clamping. Specifically, in a case where the first connection surface 1111 of the first connecting member 11 is adhesively connected to the electronic equipment accessory, the adhesive force applied to the first connection surface 1111 of the first connecting member 11 is uniform, and the first connection surface 1111 can be firmly adhered to the electronic equipment accessory. The adhesive connection can be implemented easily and quickly and has a wide application range. In a case where the first connection surface 1111 of the first connecting member 11 is magnetically connected to the electronic equipment accessory, the first connection surface 1111 of the first connecting member 11 is tightly connected to the electronic equipment accessory by magnetic attraction. If the first connection surface 1111 of the first connecting member 11 needs to be disconnected from the electronic equipment accessory, the first connection surface 1111 of the first connecting member 11 can be removed away from the electronic equipment accessory by overcoming the magnetic attraction. By means of a magnetic attraction connection way, connection and disconnection are simple, and the connection efficiency and reliability are improved. In a case where the first connection surface 1111 of the first connecting member 11 is clamped in the electronic equipment accessory, the first connection surface 1111 of the first connecting member 11 is clamped/locked in the electronic equipment accessory, and in this case, quick assembly and disassembly can be realized, and the installation is convenient.

Referring to FIGS. 28-30, in the case where the first connection surface 1111 is adhesively connected to the electronic equipment accessory, the adhesive connection area between the first connection surface 1111 and the electronic equipment accessory is greater than half of the area of the first connecting member 11. Generally, the adhesive connection area can bear a load. A larger adhesive connection area can bear a larger load. The adhesive connection area between the first connection surface 1111 and the electronic equipment accessory is set to be greater than half of the area of the first connecting member 11, such that a larger load can be borne by the adhesive connection area between the first connection surface 1111 and the electronic equipment accessory, and the first connection surface 1111 and the electronic equipment accessory can be adhesively connected more firmly.

Further, the first connecting member 11 further comprises an extension portion 113 and a bent portion 114 located between the extension portion 113 and the first connection portion 111, and one end of the second connecting member 12 is rotatably connected to the extension portion 113. The first connecting member 11 comprises a connection section contact surface 1132 which is a surface, opposite to the second connecting member 12, of the extension portion 113 when the rotating device 1 is in the folded state. The connection section contact surface 1132 is configured to be connected to an electronic equipment accessory. Specifically, when the second connecting member 12 is in the extended state to allow the electronic equipment accessory together with the second connecting member 12 to support an electronic equipment on a support surface, the second connecting member 12 provides a support force for the extension portion 113 to realize tight connection between the connection section contact surface 1132 of the extension portion 113 and the electronic equipment accessory; and the bent portion 114 provides an opposite force for the first connection portion 111 due to the principle of leverage to realize a tight connection between the first connection surface 1111 of the first connection portion 111 and the electronic equipment accessory. That is, the first connection surface 1111 and the connection section contact surface 1132 respectively abut against the electronic equipment accessory from two opposing directions when the second connecting member 12 is in the extended state to support the electronic equipment accessory on the support surface. By means of the tight connection between the first connection surface 1111 and the electronic equipment accessory and the tight connection between the connection section contact surface 1132 and the electronic equipment accessory in two opposing directions, the first connecting member 11 can be connected to the electronic equipment accessory more firmly, and the force acted on the electronic equipment accessory is distributed more uniformly when the second connecting member 12 supports the first connecting member 11 and the electronic equipment accessory, such that the rotating device 1 is unlikely to fall from the electronic equipment accessory.

Further, reinforcing ribs 1131 are arranged on a surface, opposite to the connection section contact surface 1132, of the extension portion 113 to improve the deformation resistance of the extension portion 113. Referring to FIGS. 28-30, the area of the first connection surface 1111 is greater than or equal to the area of the connection section contact surface 1132. Specifically, the first connection portion 111 of the first connecting member 11 is inserted into the interior of the electronic equipment accessory and the first connecting member 11 is connected to the electronic equipment accessory by means of the first connection surface 1111 of the first connection portion 111 which is located inside the electronic equipment accessory. To ensure that the first connecting member 11 can be connected to the electronic equipment accessory firmly and is unlikely to fall away from the electronic equipment accessory, the area of the first connection surface 1111 is set to be greater than the area of the connection section contact surface 1132 to realize an enlarged connection area between the first connecting member 11 and the electronic equipment accessory inside the electronic equipment accessory, such that the first connecting member 11 and the electronic equipment accessory are firmly connected.

An electronic equipment accessory such as a mobile phone protective case in this embodiment of the application comprises an accessory body 2 and the rotating device 1 described above. The accessory body 2 comprises an insertion and connection portion. The first connecting member 11 is inserted into the insertion and connection portion and the first connection surface 1111 is connected to the accessory body 2. Specifically, one end of the second connecting member 12 is rotatably connected to the first connecting member 11, the second connecting member 12 can support the electronic equipment accessory at different angles by means of the rotatable connection with the first connecting member 11. The first connecting member 11 of the rotating device 1 is inserted into the insertion and connection portion of the accessory body 2, and the first connection surface 1111 is connected to the accessory body 2. The first connecting member 11 is inserted into the accessory body 2 to realize connection, which is different from existing solutions where a stand is connected to an outer surface of the accessory body 2. In the present application, the rotating device 1 can be tightly connected to the accessory body 2 and is unlikely to fall from the accessory body 2, thus improving the reliability of the rotating device 1 and the electronic equipment accessory.

Figure 32:
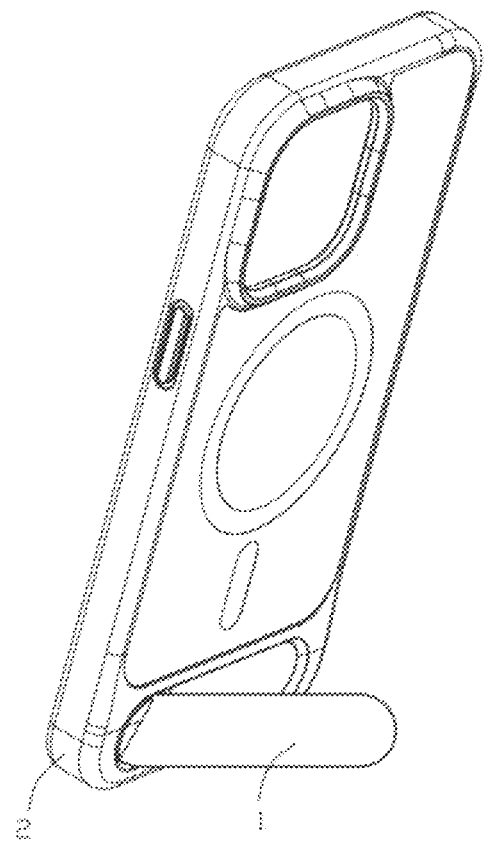
FIG. 32 is a schematic view of the electronic equipment accessory in FIG. 27 in a vertically supported state.
Figure 33:
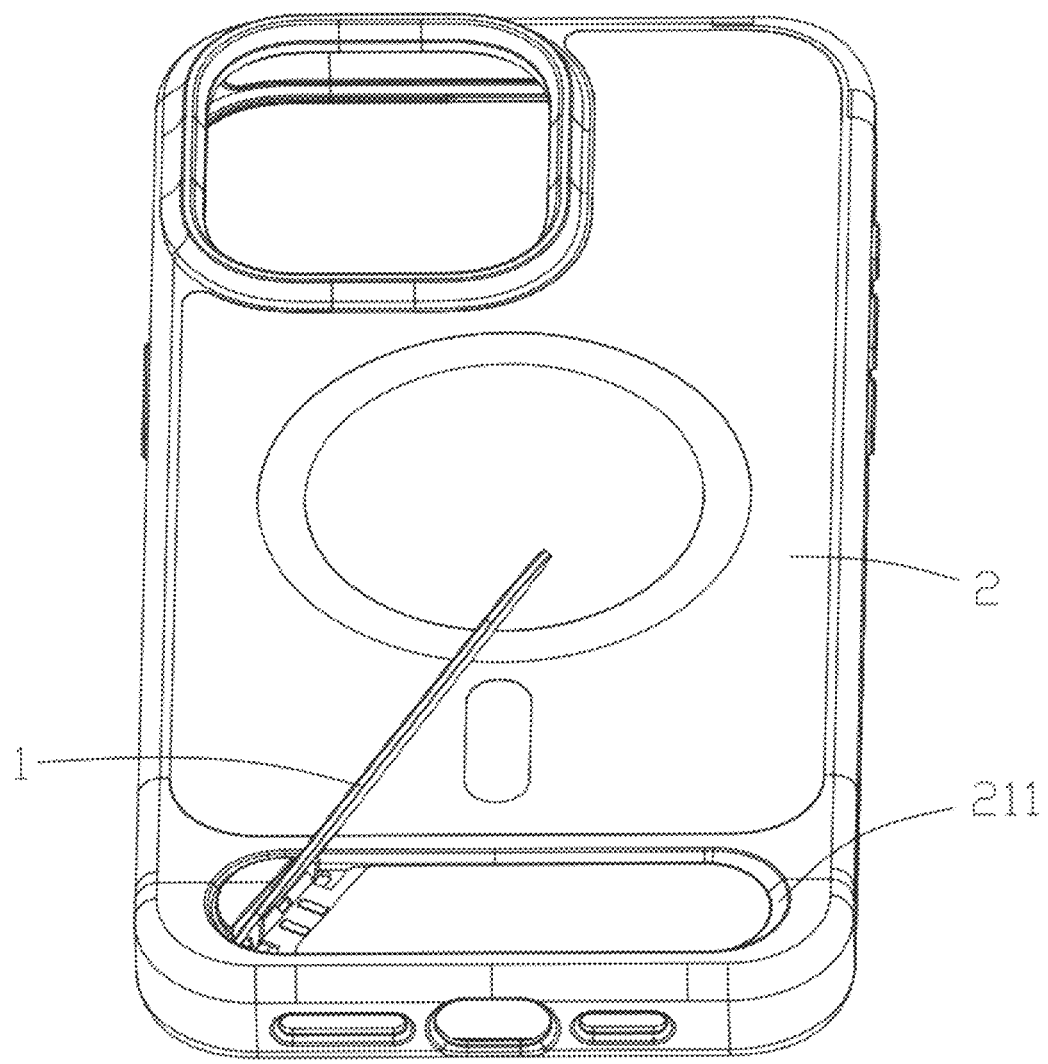
FIG. 33 is a schematic view of the electronic equipment accessory in FIG. 27 wherein the rotating device of the electronic equipment accessory is in an unfolded state.
Figure 34:
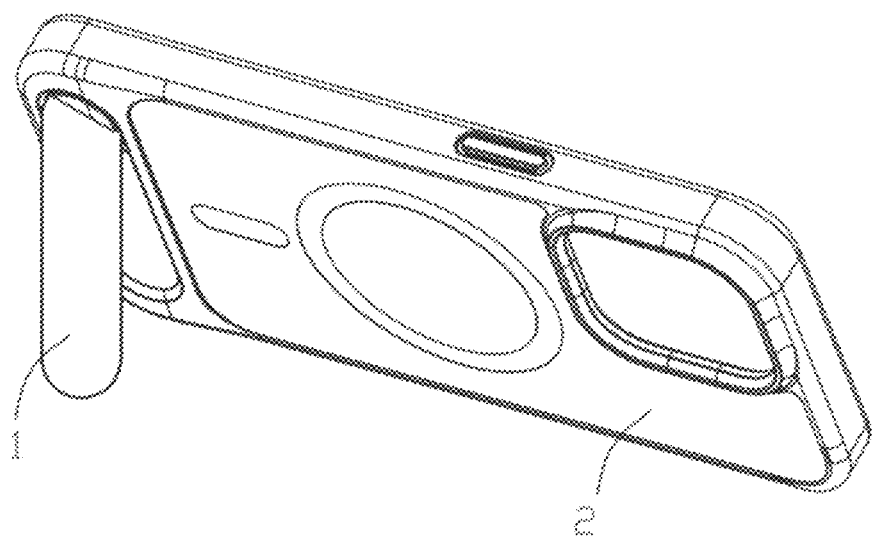
FIG. 34 is a schematic view of the electronic equipment accessory in FIG. 27 in a horizontally supported state.

Referring to FIGS. 28-29, according to the electronic equipment accessory in this embodiment of the application, the accessory body 2 comprises a back panel 21, the insertion and connection portion (not labelled) is arranged on the back panel 21 and comprises a through-hole 217 which passes through an inner surface 218a and an outer surface 218b of the back panel 21. Specifically, one end of the second connecting member 12 is rotatably connected to the first connecting member 11. Referring to FIGS. 32 and 33, the second connecting member 12 can support the electronic equipment accessory at different angles by means of the rotatable connection with the first connecting member 11. The first connecting member 11 of the rotating device 1 is inserted into the interior side of the back panel 21 via the through-hole 217 of the back panel 21, such that the rotating device 1 is tightly connected to the back panel 21 and is unlikely to fall from the back panel 21, thus improving the reliability of the rotating device 1 and the back panel 21. The electronic equipment accessory is detachably mounted on a back side of an electronic equipment such as a mobile phone. When the electronic equipment accessory is mounted on the electronic equipment, the first connecting member 11 is sandwiched between the back panel 21 and the electronic equipment, such that the rotating device 1 is connected to the back panel 21 more tightly and is unlikely to fall from the back panel 21.

Referring to FIGS. 28-30, the first connecting member 11 comprises the first connection portion 111, the bent portion 114 and the extension portion 113 which are arranged in sequence. The first connecting member 11 is inserted into the through-hole 217, the extension portion 113 is located on one side of the outer surface 218b of the back panel 21, the first connection portion 111 is located on one side of the inner surface 218b of the back panel 21, and the bent portion 114 is located at the through-hole 217. Specifically, during the process of the rotating device 1 being inserted into and connected to the back panel 21, the first connection portion 111 of the first connecting member 11 is inserted into the through-hole 217, and when the bent portion 114 reaches the through-hole 217, the first connecting member 11 is rotated with the through-hole 217 as a rotation center until the first connection portion 111 abuts against the inner surface 218a of the back panel 21, and at this moment, the extension portion 113 abuts against the outer surface 218b of the back panel 21. When the second connecting member 12 is in the extended state to support an electronic equipment accessory on a support surface, the second connecting member 12 provides a support force to urge the extension portion 113 to abut against the back panel 21; and the bent portion 114 provides an opposite force for the first connection portion 111 due to the principle of leverage to urge the first connection portion 111 to abut against the back panel 21. Thus, the first connecting member 11 and the back panel 21 are connected more firmly, and the force acted on the back panel 21 is distributed more uniformly when the second connecting member 12 is in the extended state to support the electronic equipment accessory on the support surface. In addition, the bent portion 114 is used to mount the rotating device 1 to the back panel 21, such that when the rotating device 1 needs to be moved away from the back panel 21, the first connecting member 11 needs to be rotated with the through-hole 217 as the rotation center to make the bent portion 114 away from the through-hole 217, then the first connection portion 111 can be pulled out of the through-hole 217. If the above-described operation is not performed, the rotating device 1 cannot be directly pulled out of the back panel 21, such that the rotating device 1 is less likely to fall from the back panel 21. Since the rotating device 1 is mounted on the back panel 21, users just need to install the back panel 21 on electronic equipment to thereby mount the rotating device 1 to the electronic equipment and can use the rotating device 1 anytime and anywhere according to their requirements, thus improving user experience.

Referring to FIGS. 28-30, the first connection surface 1111 is connected to the inner surface 218a of the back panel 21. Specifically, when the first connecting member 11 of the rotating device 1 is inserted into the through-hole 217 of the back panel 21, that is, when the first connecting member 11 is inserted into the interior of the back panel 21, the first connection surface 1111 of the first connecting member 11 is connected to the inner surface 218a of the back panel 21, such that the rotating device 1 is tightly connected to the back panel 21 and is unlikely to fall from the back panel 21, thus improving the reliability of the rotating device 1 and the back panel 21.

Referring to FIGS. 28 and 29, the electronic equipment accessory further comprises a first adhesive part 115 arranged between the first connection surface 1111 and the inner surface 218a of the back panel 21, and the first connection surface 1111 is adhesively connected to the inner surface 218a of the back panel 21 by means of the first adhesive part 115. By means of the adhesive part 115 arranged between the first connection surface 1111 and the inner surface 218a of the back panel 21, the first connection surface 1111 can be adhesively connected to the inner surface 218a of the back panel 21. Specifically, the first adhesive part 115 is an adhesive part with adhesive properties on both sides, such as a glue, a double-sided adhesive tape or a nano-glue. By use of the first adhesive part 115, the first connection surface 1111 can be more tightly connected to the inner surface 218a of the back panel 21, such that the rotating device 11 can be connected to the back panel 21 more firmly and the rotating device 1 is less likely to fall from the back panel 21.

Further, the electronic equipment accessory further comprises a magnetic attraction component such as the magnetic component 23 described in other embodiments. The first connecting member 11 is made from a magnet conductive metal or a permanent magnet. The magnetic attraction component is arranged at the inner surface 218a of the back panel 21, and the first connection surface 1111 is magnetically connected to the inner surface 218a of the back panel 21 by means of the magnetic attraction component. Specifically, the magnetic attraction component is arranged on the inner surface 218a of the back panel 21, the first connecting member 11 is made from a magnet conductive metal, and the magnetic component magnetically attracts the first connection surface 1111 to cause the first connection surface 1111 to be tightly connected to the inner surface 218a of the back panel 21, such that the first connecting member 11 is more firmly connected to the back panel 21, and the rotating device 1 is less likely to fall from the back panel 21.

Referring to FIGS. 28 and 29, the back panel 21 comprises a through-opening 215, and a rotary joint between the first connecting member 11 and the second connecting member 12 is located in the through-opening 215. Specifically, the second connecting member 12 needs to be frequently adjusted/rotated around the rotary joint between the first connecting member 11 and the second connecting member 123 in order to support the electronic equipment accessory at different angles, and the first connection surface 1111 of the first connecting member 11 is connected to the inner surface 218a of the back panel 21, that is, one portion of the first connecting member 11 is inserted into the interior of the back panel 21, and the other portion of the first connecting member 11 is located on the outer surface 218b of the back panel 21, in other words, the rotary joint between the first connecting member 11 and the second connecting member 12 is located on the outer surface 218b of the back panel 21, so when the second connecting member 12 is rotated with respect to the first connecting member 11, friction will be generated between the rotary joint between the first connecting member 11 and the second connecting member 12 and the outer surface 218b of the back panel 21. In order to protect the rotary joint between the first connecting member 11 and the second connecting member 12 from being damaged by the friction, the through-opening 215 is formed to receive the rotary joint between the first connecting member 11 and the second connecting member 12, so as to reduce the wear of the rotary joint between the first connecting member 11 and the second connecting member 12.

The electronic equipment accessory further comprises a second adhesive part 116, the first connecting member 11 further comprises a connection section contact surface 1132 which is a surface, opposite to the second connecting member 12, of the extension portion 113 when the rotating device 1 is in the folded state. The second adhesive part 116 is arranged between the connection section contact surface 1132 and the outer surface 218b of the back panel 21. Specifically, the first connection surface 1111 of the first connecting member 11 is connected to the inner surface 218a of the back panel 21, that is, one portion of the first connecting member 11 is inserted into the interior of the back panel 21 and the other portion of the first connecting member 11 is located on the outer surface 218b of the back panel 21 and is adhesively connected to the outer surface 218b of the back panel 21 by means of the second adhesive part 116, in other words, the second adhesive part 116 is arranged between the connection section contact surface 1132 and the outer surface 218b of the back panel 21, and the extension portion 113 is adhesively connected to the outer surface 218b of the back panel 21 by means of the second adhesive part 116. Specifically, the second adhesive part 16 is an adhesive part with adhesive properties on both sides, such as a glue, a double-sided adhesive tape or a nano-glue. By use of the second adhesive part 116, the first connecting member 11 can be more tightly connected to the outer surface 218b of the back panel 21, such that the first connecting member 11 is connected to the back panel 21 more firmly, and the rotating device 1 is less likely to fall from the back panel 21.

Referring to FIGS. 28 and 29, the electronic equipment accessory comprises a first attachment part 24 which covers the first connecting member 11 and the insertion and connection portion of the back panel 21 for preventing the first connecting member 11 from being pulled out of the back panel 21. Specifically, the first attachment part 24 covers the first connecting member 11 and the insertion and connection portion of the back panel 21 and blocks the first connecting member 11 from being pulled out of the back panel 21, such that when users hold the second connecting member 12 by hands, the first attachment part 24 provides a resistance to prevent the first connecting member 11 from being pulled out of the back panel 21, thus further improving the connection firmness between the rotating device 1 and the back panel 21.

Referring to FIGS. 27 and 28, a receiving groove 211 is formed in the outer surface 218b of the back panel 21, and the through-hole 217 is located in the receiving groove 211. Specifically, the receiving groove 211 is concavely formed in the outer surface 218b of the back panel 21 and used for receiving the rotating device 1. Referring to FIG. 27, the first connecting member 11 of the rotating device 1 is inserted into the insertion and connection portion of the back panel 21, the second connecting member 12 of the rotating device 1 is stacked on the first connecting member 11b when not used, and at this moment, the second connecting member 12 is received in the receiving groove 211, that is, the rotating device 1 is received in the receiving groove 211 and is exactly flush with the back panel 21, such that the back panel 21 can be flatly placed on a support surface such as a top surface of a desk.

Referring to FIG. 27, the support member of the rotating device 1 comprises an arcuate outer end away from the shaft. The receiving groove 211 comprises an arcuate inner end wall away from the shaft, the receiving groove 211 defines a length direction parallel to the width direction of the back panel 21 and a width direction parallel to the length direction of the back panel 21, and the arcuate inner end wall of the receiving groove 211 faces the arcuate outer end of the support member with a gap formed therebetween. The gap has a size S in the width direction of the back panel 21. The size S refers to the distance between the outmost edge of the support member and the innermost edge of the inner end wall of the receiving groove 211. The arcuate inner end wall of the receiving groove 211 away from the shaft comprises an inclined surface M which is inclined outwardly in a direction from the inner surface toward the outer surface of the back panel 21. The projection of the inclined surface M on the inner surface of the back panel 21 in the thickness direction of the back panel 21 has a size, in the width direction of the back panel 21, which gradually decreases from a middle of the inclined surface M to opposite sides of the inclined surface M in the length direction of the back panel 21. Thus, the size S of the gap in the length direction of the receiving groove 211 gradually decreases from a middle of the gap to opposite sides of the gap in the width direction of the receiving groove 211, which facilitates users' fingers to enter into the middle of the gap to open the support member. Preferably, the size S of the gap has a maximum value at the middle of the gap and the maximum value is in a range of 1-2.5 mm. The projection of the inclined surface M on the inner surface of the back panel 21 in the thickness direction of the back panel 21 has a maximum value at the middle of projection of the inclined surface M and the maximum value of the projection of the inclined surface M is in a range of 1.5-3.5 mm. The support member has a width in a range of 18-25 mm and a length in a range of 65-75 mm. The thickness, in the thickness direction of the back panel 21, of the end of the support member away from the shaft is less than that of the middle portion of the support member. The length of the support member refers to the distance from the leftmost end of the support member to the rightmost end of the support member as shown in FIG. 27 where the second connecting member 12 acts as the support member.

The electronic equipment accessory further comprises a second attachment part 25 which covers the bottom of the receiving groove 211 from the interior side of the back panel 21, and/or the attachment part 25 covers the inner surface 218a of the back panel 21 and the first connecting member 11. Specifically, the back panel 21 defines the through-hole 217 and one portion of the first connecting member 11 is inserted through the through-hole 217 to allow the first connection surface 1111 to be connected to the inner surface 218a of the back panel 21. In order to prevent the portion, inserted into the back panel 21, of the first connecting member 11 from contacting with electronic equipment such as a mobile phone or a tablet mounted inside of the back panel 21, the second attachment part 25 is arranged to cover the portion, inserted into the back panel 21, of the first connecting member 11. The second attachment part 25 can withstand the support force of the second connecting member 12 when the second connecting member 12 supports the back panel 21 and the electronic equipment such as the mobile phone and the tablet in the back panel 21, such that imprints will not be left on the electronic equipment when the electronic equipment is supported for a long time, thus guaranteeing the aesthetics of the accessory body.

It can be understood that the above embodiments are merely used for explaining the application by way of examples, and the technical solutions of the embodiments can be combined freely and used together without causing conflicts and contradictions of the technical features and deviating from the purpose of the application.

Finally, it should be noted that the above embodiments are merely used for explaining the technical solutions of the application rather than limiting the application. Although the application has been described in detail with reference to the above embodiments, those ordinarily skilled in the art should understand that modifications can be made to the technical solutions recorded in the above embodiments or equivalent substitutions can be made to part of technical features in the above embodiments, and all these modifications or substitutions will not make the essence of the corresponding technical solutions deviate from the spirit and scope of the technical solutions of the embodiments of the application.

What is claimed is:

1. An electronic equipment accessory, comprising:
   an accessory body for attaching to an electronic device, the accessory body comprising a back panel, the back panel having a top edge and a bottom edge opposite to the top edge, the back panel comprising a first area adjacent to the bottom edge; and
   a rotating device mounted to the back panel and located at the first area, the rotating device comprising a shaft which inclines with respect to the bottom edge;
   wherein the rotating device comprises a first connecting member and a second connecting member which are pivotably connected to each other via the shaft;
   the back panel defines a through opening in which the shaft is located, the through opening passing through the back panel in a thickness direction of the back panel;
   the back panel comprises an inner surface and an outer surface opposite to the inner surface in the thickness direction of the back panel;
   a receiving groove is defined in the outer surface of the back panel and the second connecting member is received in the receiving groove;
   the second connecting member acts as or is connected to a support member;
   the support member comprises an arcuate outer end opposite to the shaft;
   the receiving groove comprises an arcuate inner end wall opposite to the shaft;
   the arcuate inner end wall of the receiving groove comprises an inclined surface, and a projection of the inclined surface on the inner surface of the back panel in the thickness direction of the back panel comprises an arcuate outer edge and an arcuate inner edge;
   a gap is formed between the arcuate inner edge and a projection of the arcuate outer end of the support member on the inner surface of the back panel in the thickness direction of the back panel;
   the receiving groove defines a length direction parallel to the bottom edge of the back panel and a width direction; and
   a size of the gap in the length direction gradually decreases from a middle of the gap to opposite sides of the gap in the width direction.

2. The electronic equipment accessory according to claim 1, wherein an angle formed between an axial direction of the shaft and a length direction of the bottom edge is greater than or equal to 45° and less than or equal to 75°.

3. The electronic equipment accessory according to claim 1, wherein the second connecting member is pivotable relative to the first connection member between an initiate position in which the first connecting member and the second connecting member are located at the first area and distributed on opposite sides of the through opening in a width direction of the back panel and an inclined position in which the second connecting member is inclined relative to the first connecting member; and the width direction of the back panel is perpendicular to the thickness direction of the back panel.

4. The electronic equipment accessory according to claim 3, wherein a support member is connected to the second connecting member and rotatable together with the second connecting member relative to the first connecting member, and the first connecting member is fixedly connected to the back panel; the support member is connected to a side of the second connecting member opposite to the back panel, the second connecting member is connected to the shaft.

5. The electronic equipment accessory according to claim 1, wherein the back panel comprises a second area which is located between the first area and the top edge, and a magnetic attraction component is disposed at the second area.

6. The electronic equipment accessory according to claim 5, wherein the magnetic attraction component comprises a first magnetic attraction member which comprises a plurality of segmented magnets arranged in a ring shape; and the back panel is provided with a ring-shaped cover stacked on the first magnetic attraction member in a thickness direction of the back panel.

7. The electronic equipment accessory according to claim 6, wherein the magnetic attraction component further comprises a second magnetic attraction member which has a strip shape and is located between the first magnetic attraction member and the rotating device; and the back panel is provided with a strip-shaped cover with two arcuate ends, and the strip-shaped cover is stacked on the two sections of the second magnetic attraction member in the thickness direction of the back panel.

8. An electronic equipment accessory comprising:

an accessory body for attaching to an electronic device, the accessory body comprising back panel, the back panel having a top edge and a bottom edge opposite to the top edge, the back panel comprising a first area adjacent to the bottom edge; and a rotating device mounted to the back panel and located at the first area, the rotating device comprising a shaft which inclines with respect to the bottom edge;

wherein the rotating device comprises a first connecting member and a second connecting member which are pivotably connected to each other via the shaft;

the back panel defines a through opening in which the shaft is located, the through opening passing through the back panel in a thickness direction of the back panel;

wherein the back panel comprises an inner surface and an outer surface opposite to the inner surface in the thickness direction of the back panel;

a receiving groove is defined in the outer surface for receiving the second connecting member;

at least one part of the first connecting member is fixed to the inner surface of the back panel opposite to the receiving groove such that a part of the back panel is located between the at least one part of the first connecting member and the second connecting member in the thickness direction of the back panel; and at least another part of the first connecting member extends outwardly to pass through the through opening to connect the second connecting member via the shaft, or at least another part of the first connecting member is received in the through opening to connect the second connecting member via the shaft.

9. The electronic equipment accessory according to claim 8, wherein the receiving groove comprises a first bottom wall and a second bottom wall offset from the first bottom wall in the thickness direction of the back panel, a through hole is defined between the first bottom wall and the second bottom wall, and the first connecting member passes through the through hole.

10. The electronic equipment accessory according to claim 9, wherein the first connecting member comprises a first connection portion, a bent portion and an extension portion arranged in sequence;

the extension portion is located at the outer surface of the back panel;

the first connection portion is located at the inner surface of the back panel; and the bent portion is located at the through hole.

11. The electronic equipment accessory according to claim 8, further comprising a first attachment part which is located at the receiving groove and covers an outside of the first connecting member, wherein the first attachment part has a periphery conformed to that of the first connecting member.

12. The electronic equipment accessory according to claim 8, further comprising an attachment part which is located at the inner surface of the back panel opposite to the receiving groove; and the attachment part completely covers the first connecting member and the through opening.

13. The electronic equipment accessory according to claim 8, wherein the receiving groove comprises a first bottom wall and a second bottom wall offset from the first bottom wall in the thickness direction of the back panel;

a through hole is defined between the first bottom wall and the second bottom wall; and the first bottom wall is located between the through hole and the through opening, one part of the first connecting member is located outside of the first bottom wall while another part of the first connector member is located inside of the second bottom wall in the thickness direction of the back panel.

14. An electronic equipment accessory, comprising:

an accessory body comprising a back panel, the back panel having a top edge and a bottom edge opposite to the top edge, the back panel comprising a first area adjacent to the bottom edge; and a rotating device mounted to the back panel and located at the first area, the rotating device comprising a shaft which inclines with respect to the bottom edge;

wherein the rotating device comprises a first connecting member and a second connecting member which are pivotably connected to each other via the shaft; and the back panel defines a through opening in which the shaft is located;

the back panel comprises an inner surface and an outer surface opposite to the inner surface in a thickness direction of the back panel;

a receiving groove is defined in the outer surface for receiving the rotating device;

at least one part of the first connecting member is fixed to the inner surface of the back panel;

the receiving groove comprises a first bottom wall and a second bottom wall offset from the first bottom wall in the thickness direction of the back panel;

the through opening is defined between the first bottom wall and the second bottom wall; and the first bottom wall is sandwiched between the first connecting member and a mounting member in the thickness direction of the back panel;

wherein one side of the mounting member facing the second connecting member defines a notch, and the shaft is received in the notch.

15. The electronic equipment accessory according to claim 14, wherein the second connecting member acts as or is connected to a support member;

the support member comprises a support point formed at a free end thereof;

when the free end of the support member is moved away from the accessory body to be located at a support state, the support point and the bottom edge cooperatively define a support surface, and an included angle formed between the support surface and the back panel is greater than or equal to 60° and less than or equal to 75°.

* * * * *